US005761479A

United States Patent [19]
Huang et al.

[11] Patent Number: 5,761,479
[45] Date of Patent: *Jun. 2, 1998

[54] UPGRADEABLE/DOWNGRADEABLE CENTRAL PROCESSING UNIT CHIP COMPUTER SYSTEMS

[75] Inventors: Hung-Ta Huang, Taipei; Te-Chih Chuang, Miao-Lee; Yunn-Hung Liao; Yi-Hsien Lee, both of Taipei; Lung Wei, Taichung, all of Taiwan

[73] Assignee: Acer Incorporated, Taiwan, China

[*] Notice: The term of this patent shall not extend beyond the expiration date of Pat. No. 5,546,563.

[21] Appl. No.: 422,081

[22] Filed: Mar. 31, 1995

Related U.S. Application Data

[63] Continuation-in-part of Ser. No. 998,879, Dec. 28, 1992, Pat. No. 5,455,927, which is a continuation of Ser. No. 748,780, Aug. 22, 1991, abandoned, and a continuation-in-part of Ser. No. 208,056, Mar. 8, 1994, Pat. No. 5,551,012, which is a continuation of Ser. No. 872,611, Apr. 22, 1992, abandoned, which is a continuation-in-part of Ser. No. 689,317, Apr. 22, 1991, abandoned.

[51] Int. Cl.$^6$ .................................................. G06F 15/76
[52] U.S. Cl. ........................ 395/500; 395/551; 395/280; 395/284
[58] Field of Search .............................. 395/500, 575, 395/800, 309, 551, 280, 283, 284; 371/11.1, 9.1

[56] References Cited

U.S. PATENT DOCUMENTS

| Re. 31,318 | 7/1983 | Kaufman et al. | 395/400 |
|---|---|---|---|
| 3,721,961 | 3/1973 | Edstrom et al. | 364/172.5 |
| 4,075,693 | 2/1978 | Fox et al. | 364/200 |
| 4,281,392 | 7/1981 | Grants et al. | 395/425 |
| 4,319,343 | 3/1982 | Powell | 365/196 |
| 4,443,846 | 4/1984 | Adcock | 364/200 |
| 4,484,273 | 11/1984 | Stiffler et al. | 364/200 |

(List continued on next page.)

FOREIGN PATENT DOCUMENTS

| 0333318 | 9/1989 | European Pat. Off. |
|---|---|---|
| 0351961 | 1/1990 | European Pat. Off. |
| 0381448 | 8/1990 | European Pat. Off. |
| 0411806 | 2/1991 | European Pat. Off. |
| 61-84764 | 4/1986 | Japan . |
| 61-84765 | 4/1986 | Japan . |
| 61-84767 | 4/1986 | Japan . |

OTHER PUBLICATIONS

IBM Technical Disclosure Bulletin, IBM Corp., Sep. 1989, vol. 32, No. 4A, p. 467.
"Motherboard Convertibility," *BYTE*, Jun. 1991, p. 68.
*Electronic Engineering Times*, "Intel Rolls Out Road Map: At PC EXPO: Upgraded Plans and 586 Hints," Jul. 9, 1991.
Spiegelman, Lisa L., "12 New Microprocessors to be Unleashed by Intel: Move Could Speed User Upgrades," *Computer Reseller News*, Jul. 1, 1991.
Judy Wong, Modular CPU Upgrade Comparison of Acer, ALR and AST, Jun. 13, 1991, pp. 1–2.
"Multiple Microprocessor Interfaces for a General–Purpose Control Module," *IBM Technical Disclosure Bulletin*, Oct. 1989, vol. 32, No. 5B, pp. 311–313.

*Primary Examiner*—Kevin J. Teska
*Assistant Examiner*—Thai Phan
*Attorney, Agent, or Firm*—Townsend and Townsend and Crew LLP

[57] ABSTRACT

A single chip replacement upgradeable/downgradeable data processing system capable of operating with different types of central processing unit (CPU) chips. The system has a first socket for registration of a first CPU chip and a second socket for registration of a second CPU chip. Circuitry is provided for preventing possible signal contention between the first and second CPU chips and for synchronizing clocks for operating a CPU with the system clock. Circuitry is also provided for interfacing with a coprocessor associated with the different types of CPU chips as well as for adjusting the signals to and from the CPU chips to the signal width of the system.

8 Claims, 18 Drawing Sheets

U.S. PATENT DOCUMENTS

| | | | |
|---|---|---|---|
| 4,528,626 | 7/1985 | Dean et al. | 364/200 |
| 4,591,975 | 5/1986 | Wade et al. | 395/725 |
| 4,674,089 | 6/1987 | Poret et al. | 395/183.04 |
| 4,703,419 | 10/1987 | Kraus et al. | 395/725 |
| 4,716,526 | 12/1987 | Mori et al. | 395/800 |
| 4,860,252 | 8/1989 | Sykora | 395/400 |
| 4,862,355 | 8/1989 | Newman et al. | 364/200 |
| 4,899,306 | 2/1990 | Greer | 395/500 |
| 4,908,789 | 3/1990 | Blokkum et al. | 395/425 |
| 4,947,478 | 8/1990 | Maeno | 395/325 |
| 4,951,248 | 8/1990 | Lynch | 395/425 |
| 4,953,930 | 9/1990 | Ramsey et al. | 350/357 |
| 4,964,074 | 10/1990 | Suzuki et al. | 395/900 |
| 4,975,838 | 12/1990 | Mizuno et al. | 364/222.3 |
| 5,077,686 | 12/1991 | Rubinstein | 395/550 |
| 5,093,908 | 3/1992 | Beacom et al. | 395/375 |
| 5,101,342 | 3/1992 | Namimoto | 395/800 |
| 5,109,506 | 4/1992 | Begun | 395/575 |
| 5,121,486 | 6/1992 | Kurihara et al. | 395/325 |
| 5,138,708 | 8/1992 | Vosbury | 395/575 |
| 5,202,976 | 4/1993 | Hansen et al. | 395/500 |
| 5,287,460 | 2/1994 | Olsen et al. | 395/275 |
| 5,297,272 | 3/1994 | Lu et al. | 395/500 |
| 5,325,490 | 6/1994 | Brasseur | 395/325 |

MAPS
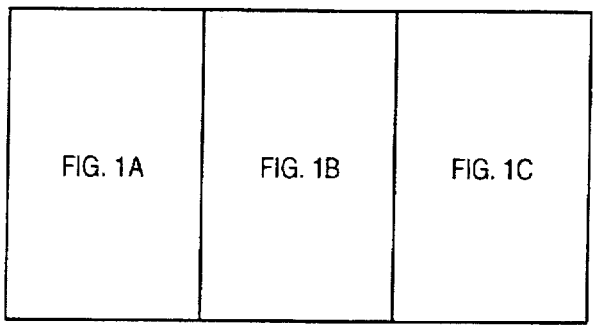
FIG_1
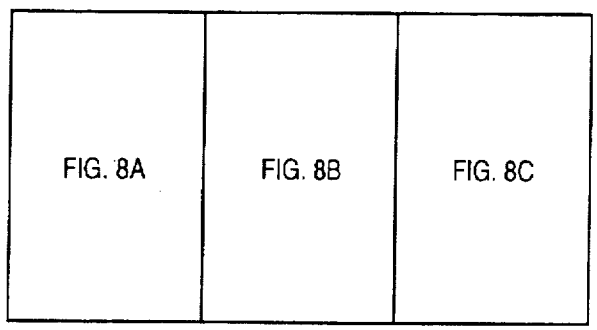
FIG_8
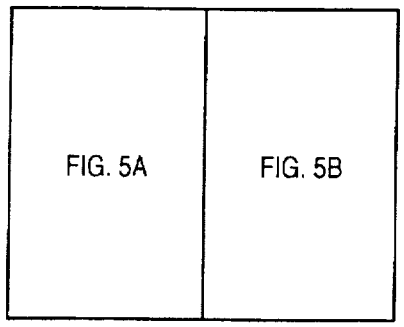
FIG_5

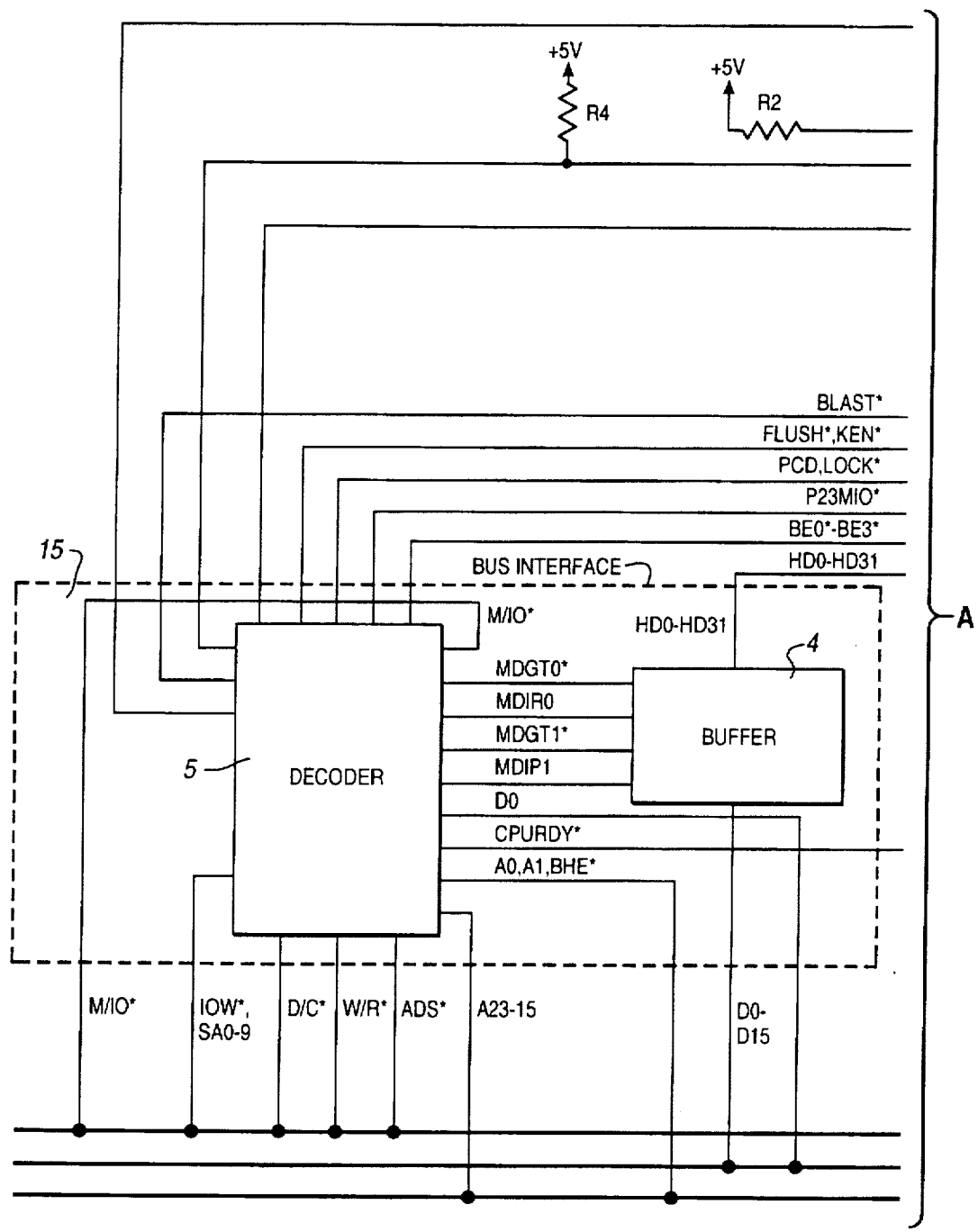
FIG_1A

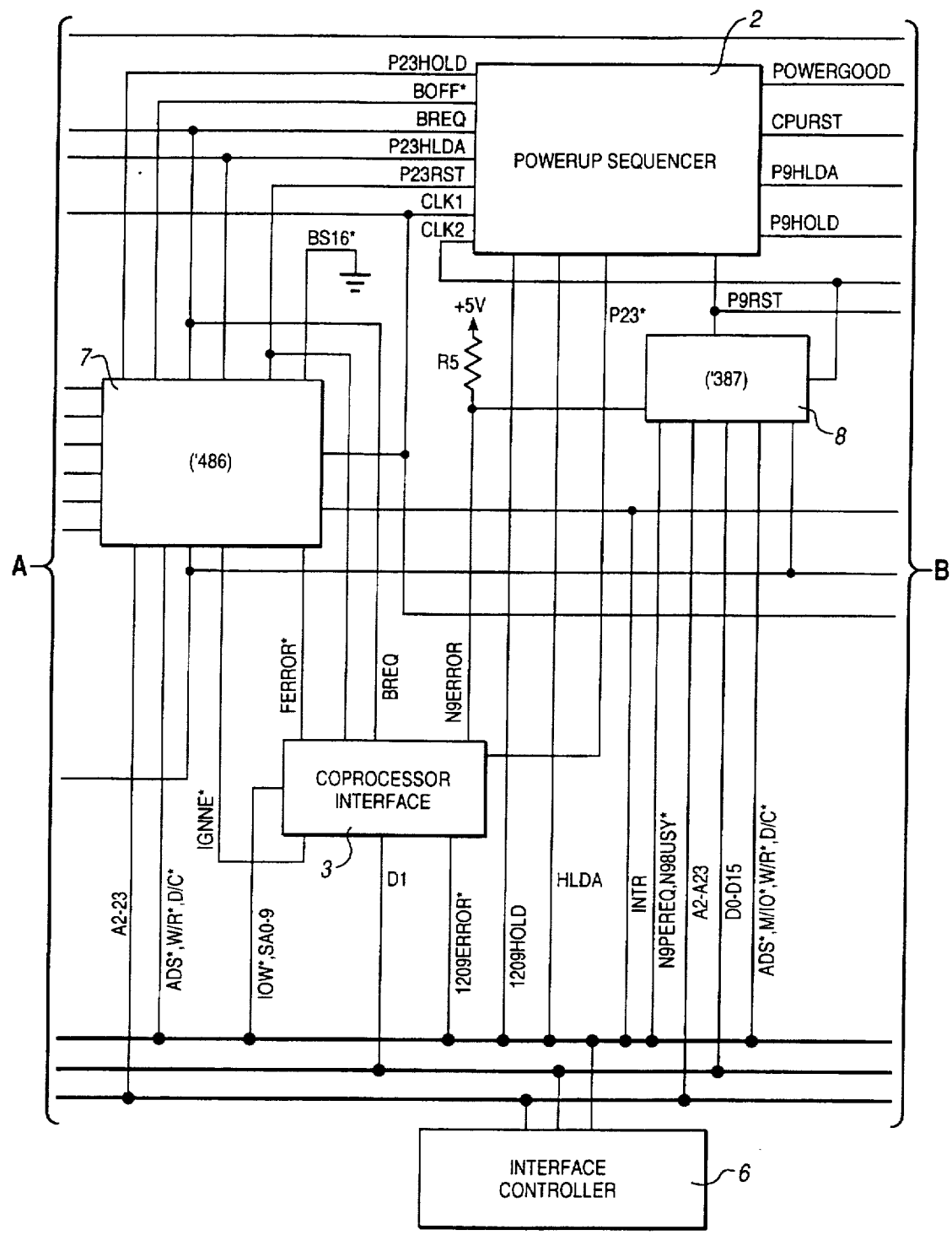
FIG_1B

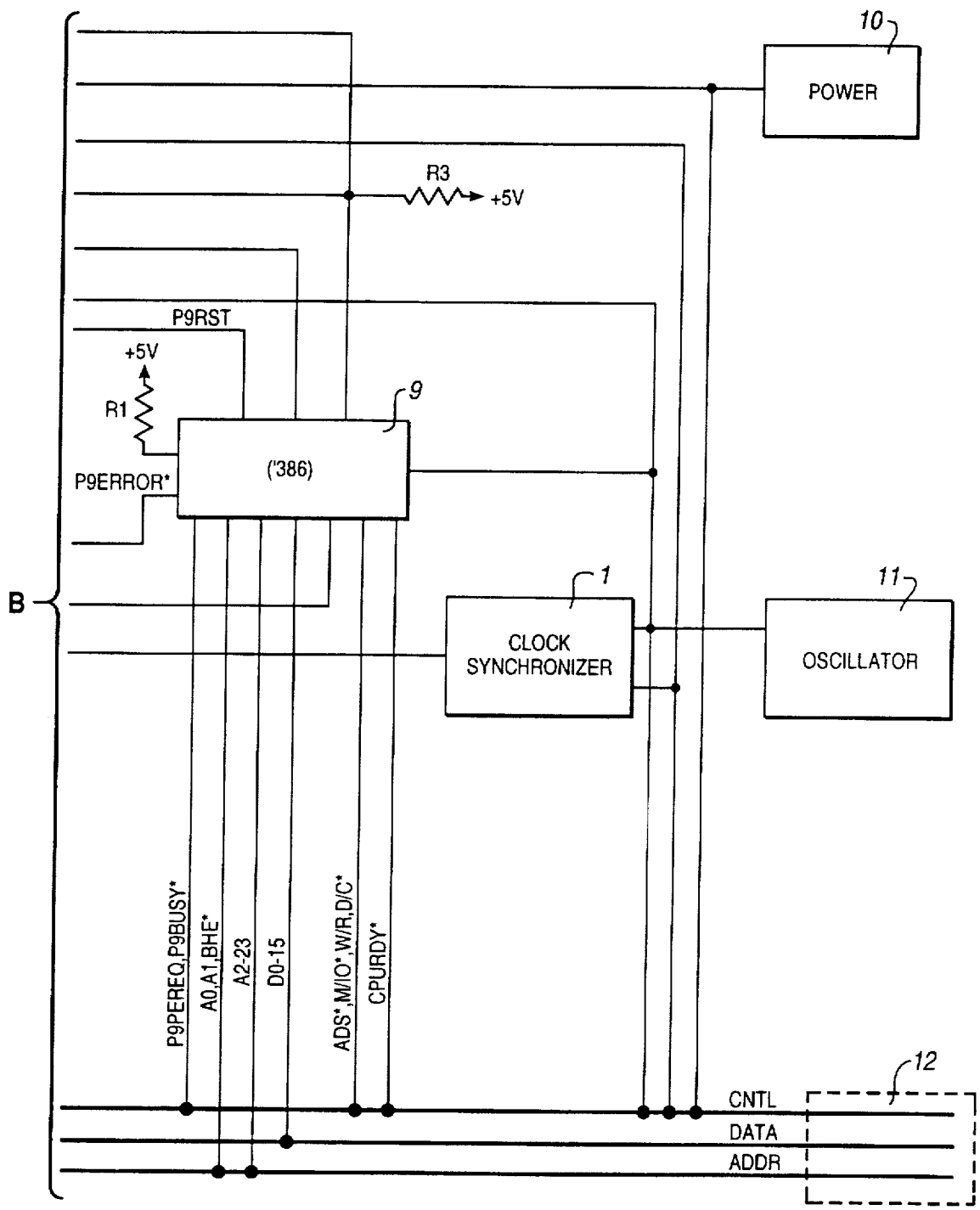
FIG_1C

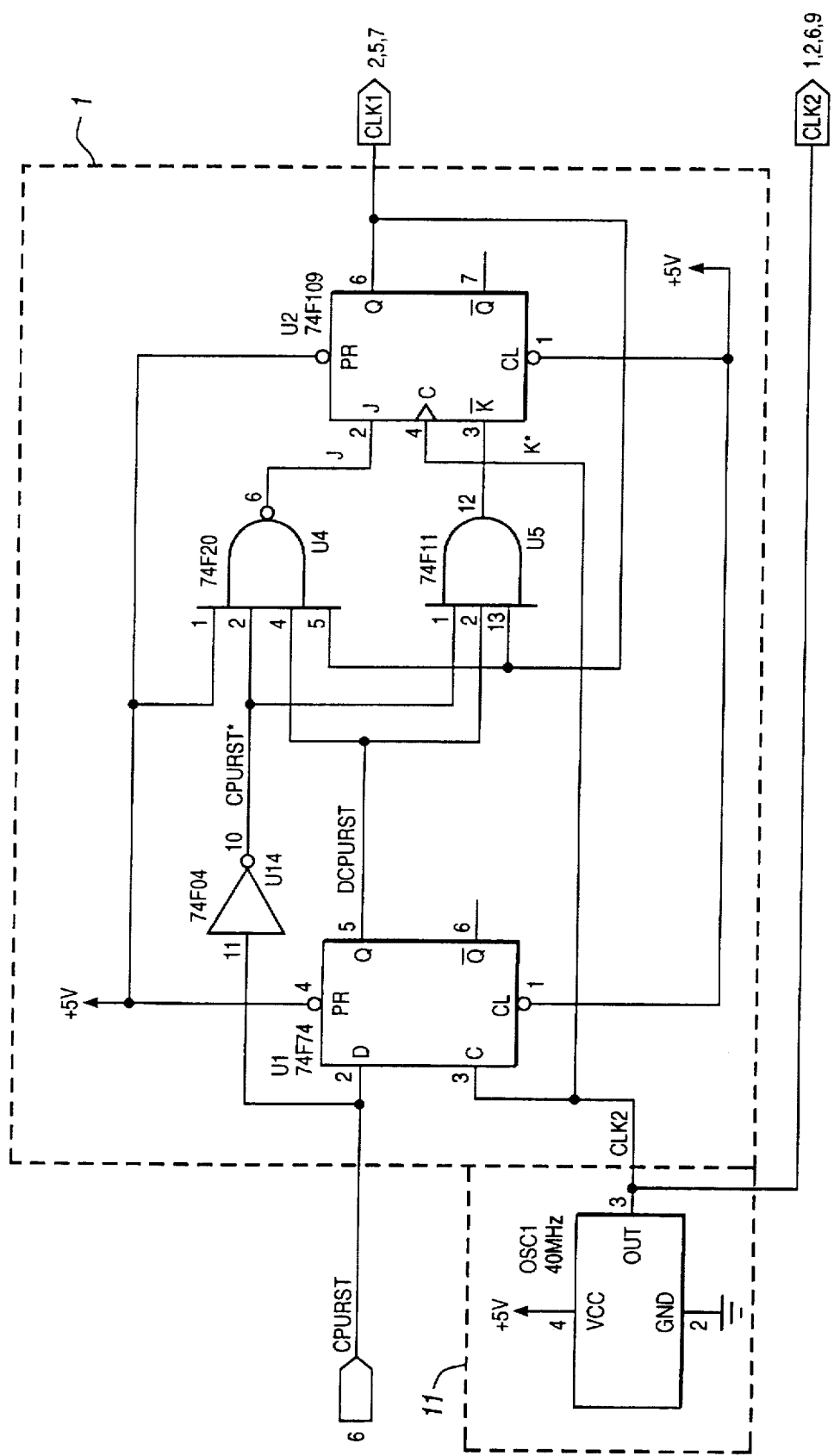
FIG_2

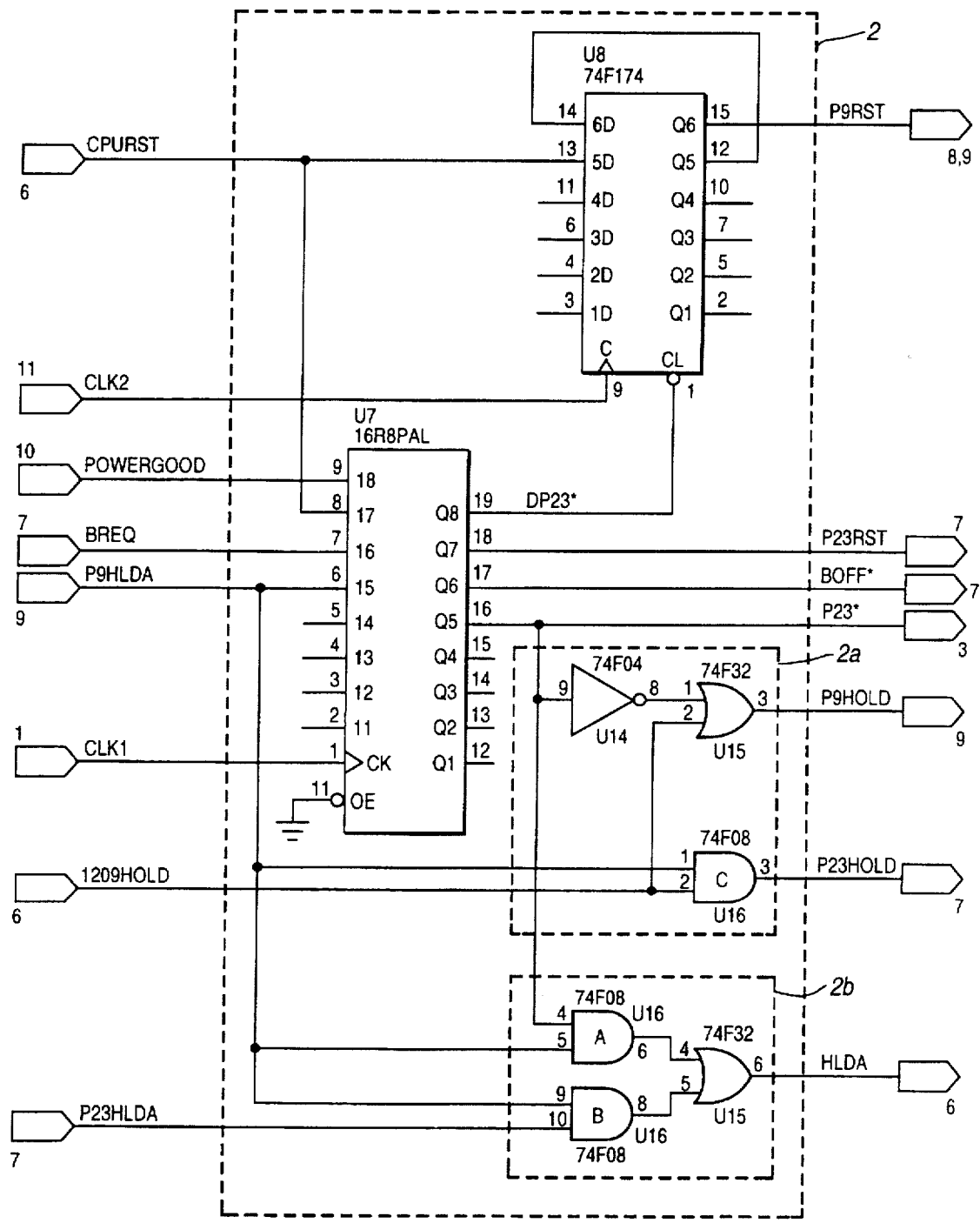
FIG_3

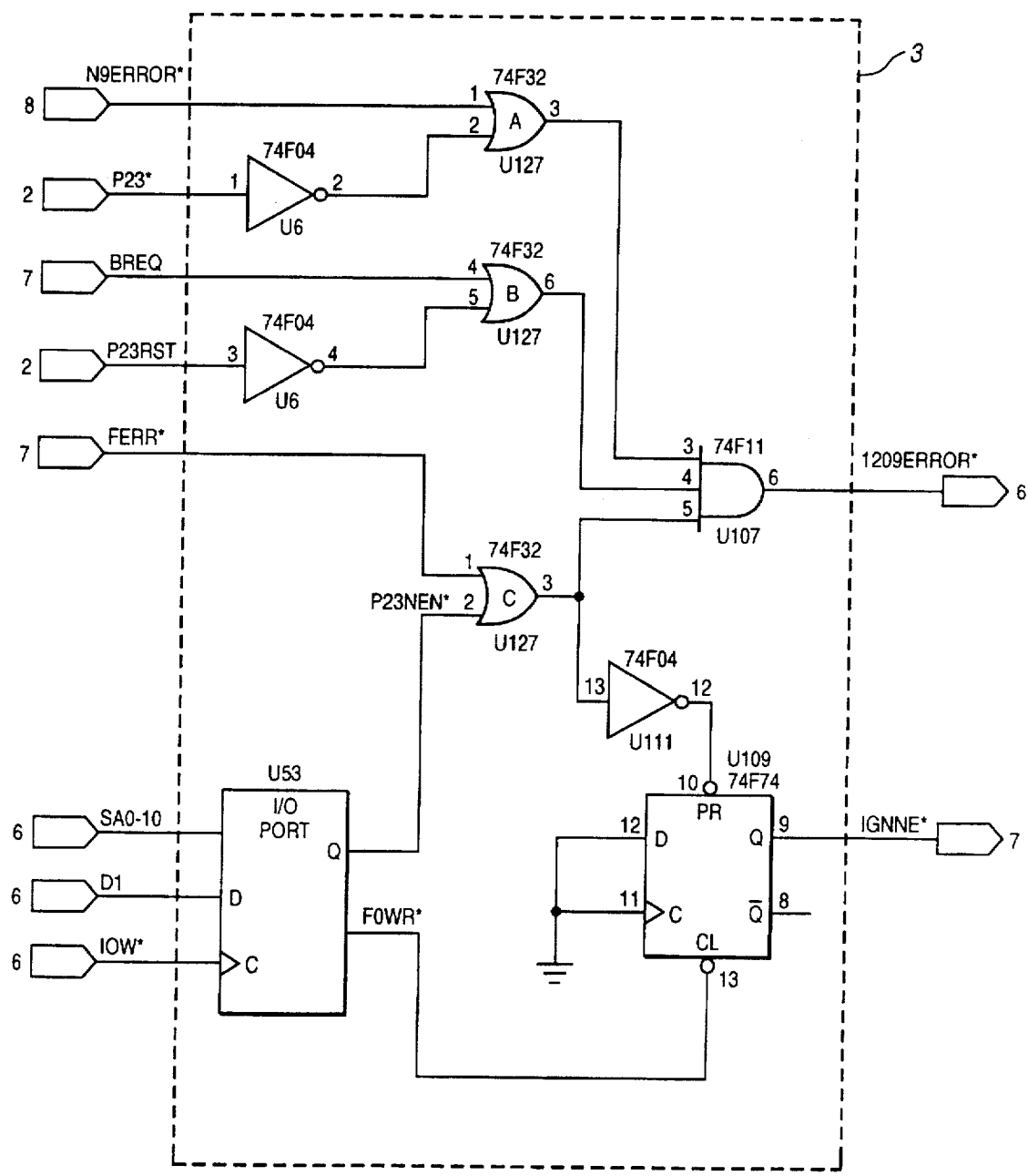
FIG_4

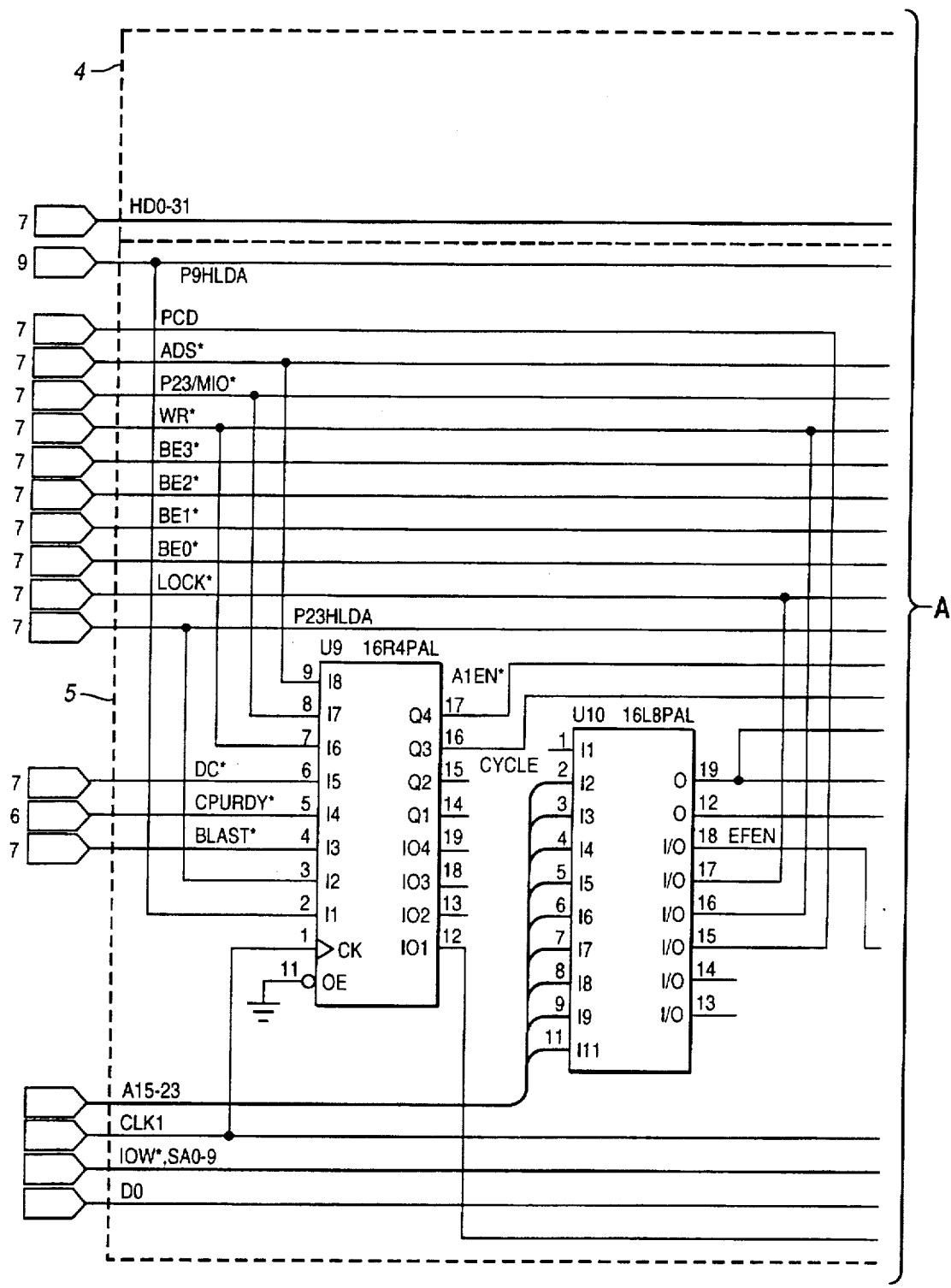
FIG_5A

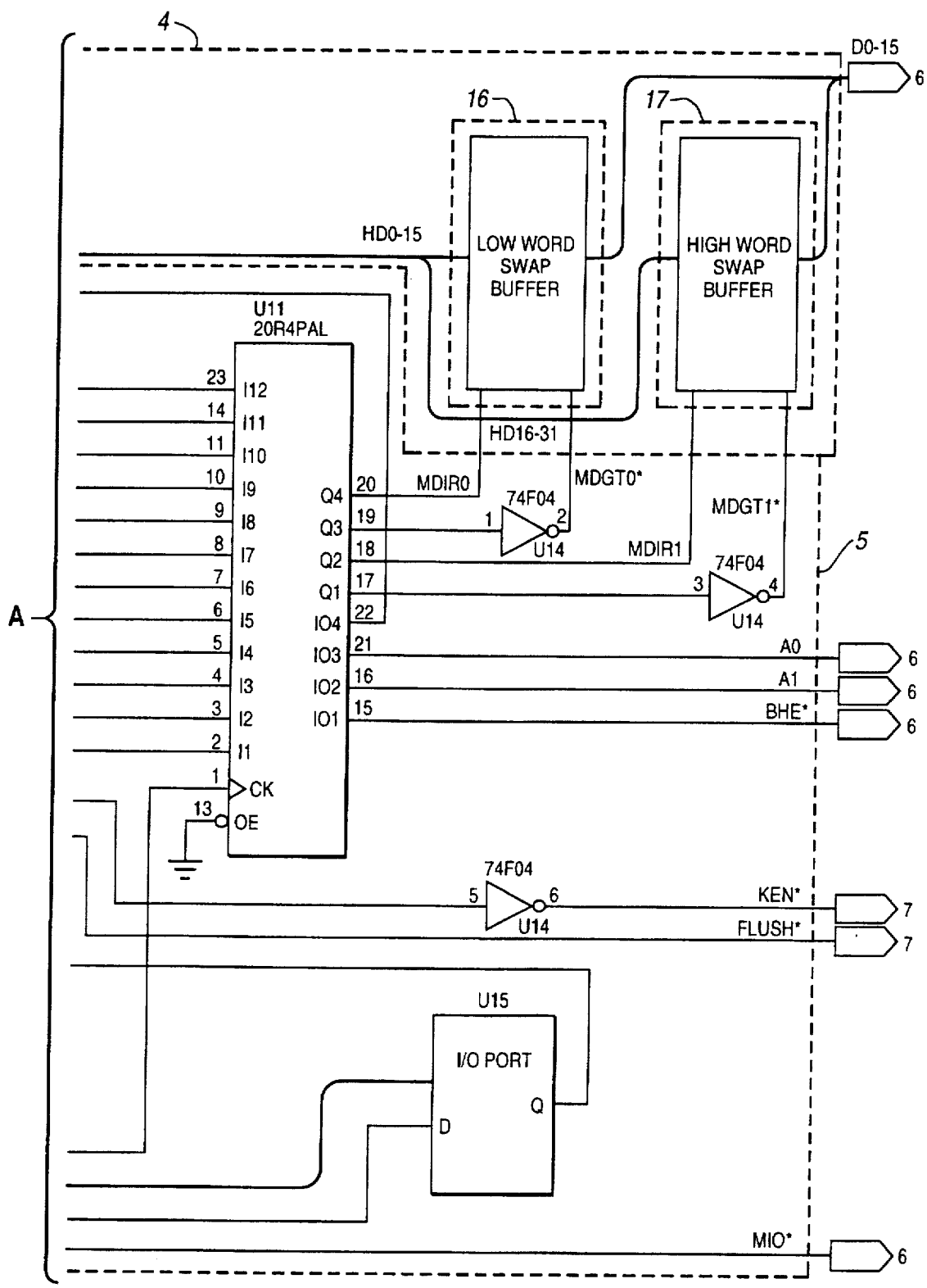
FIG_5B

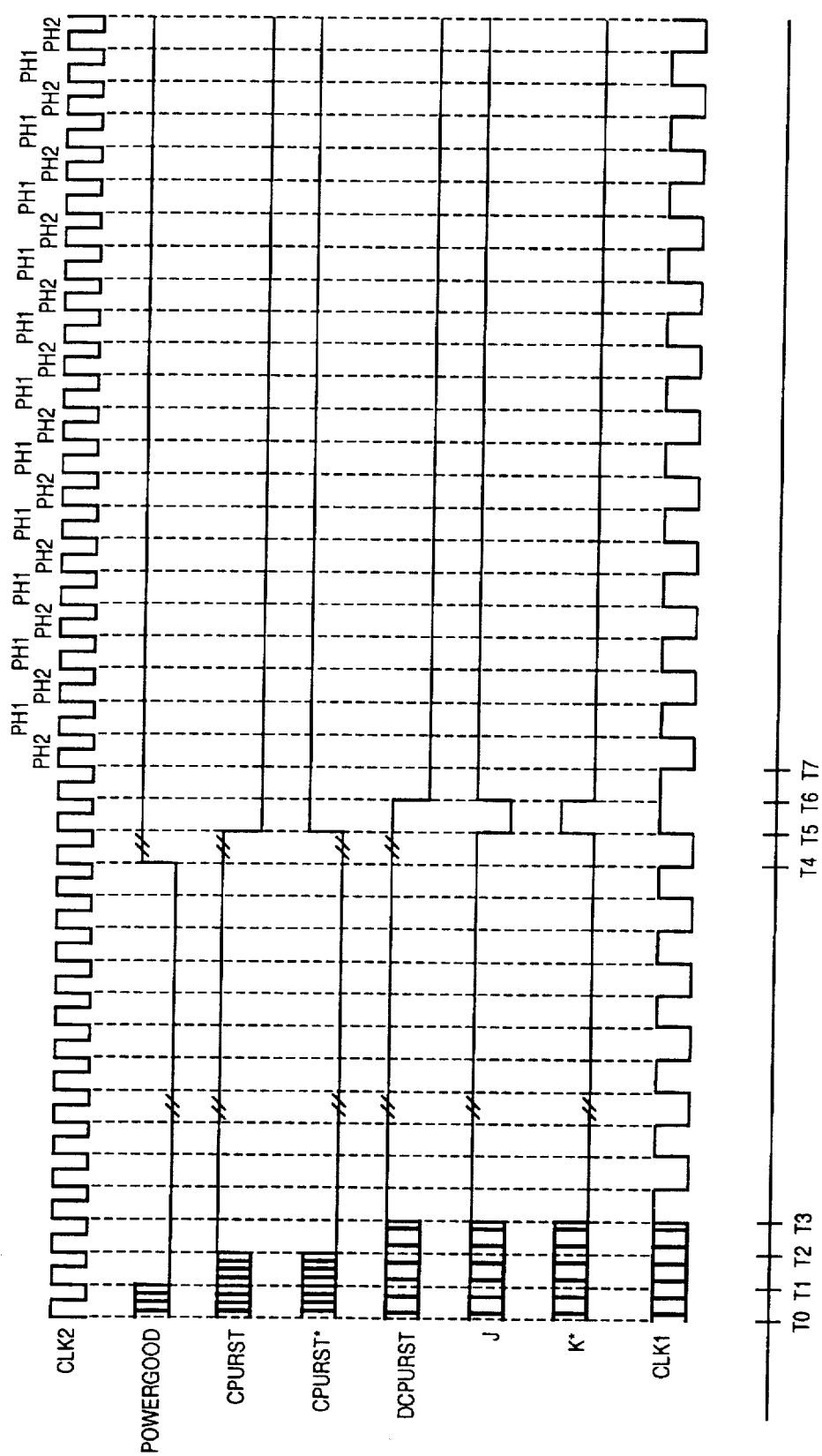

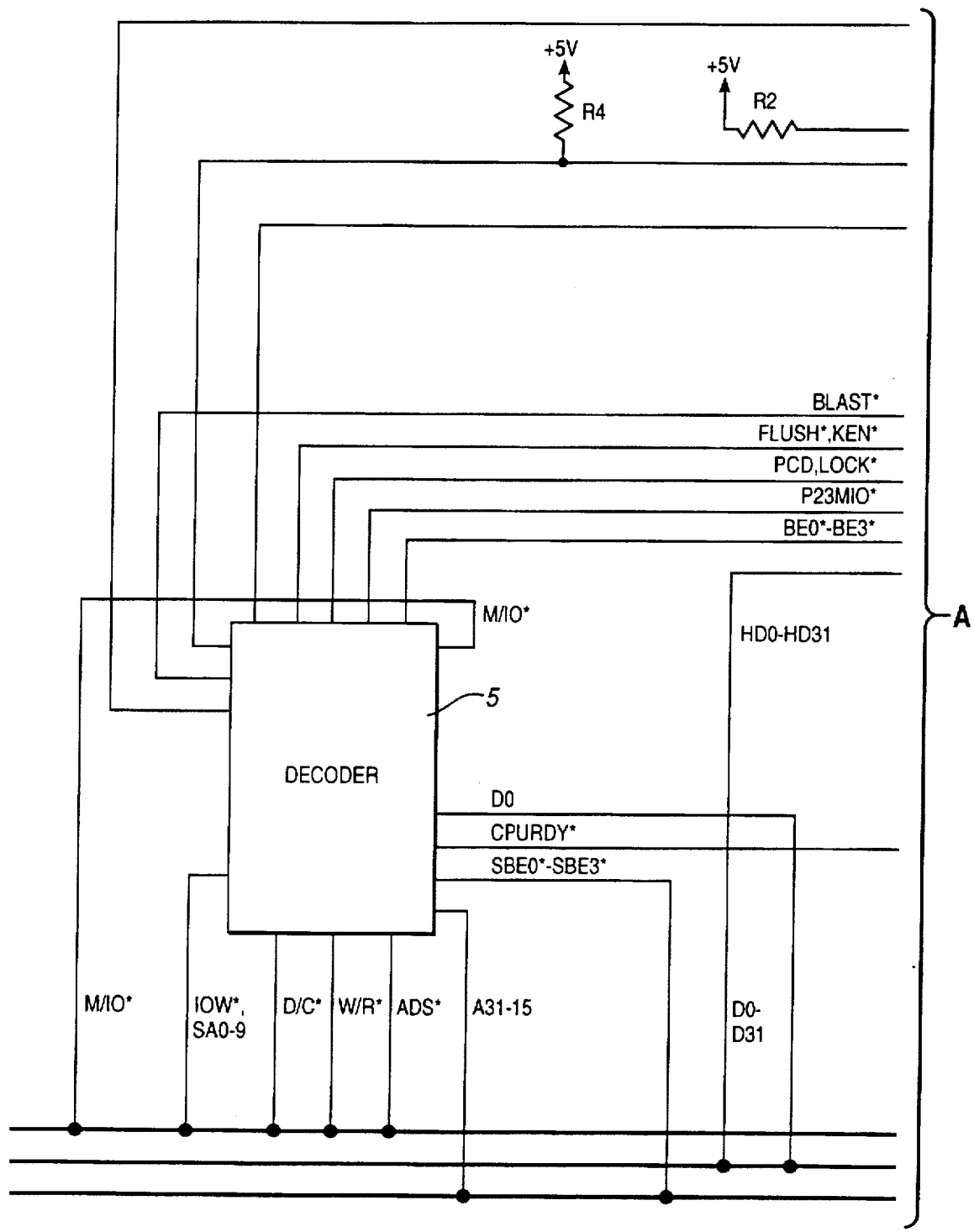
FIG_8A

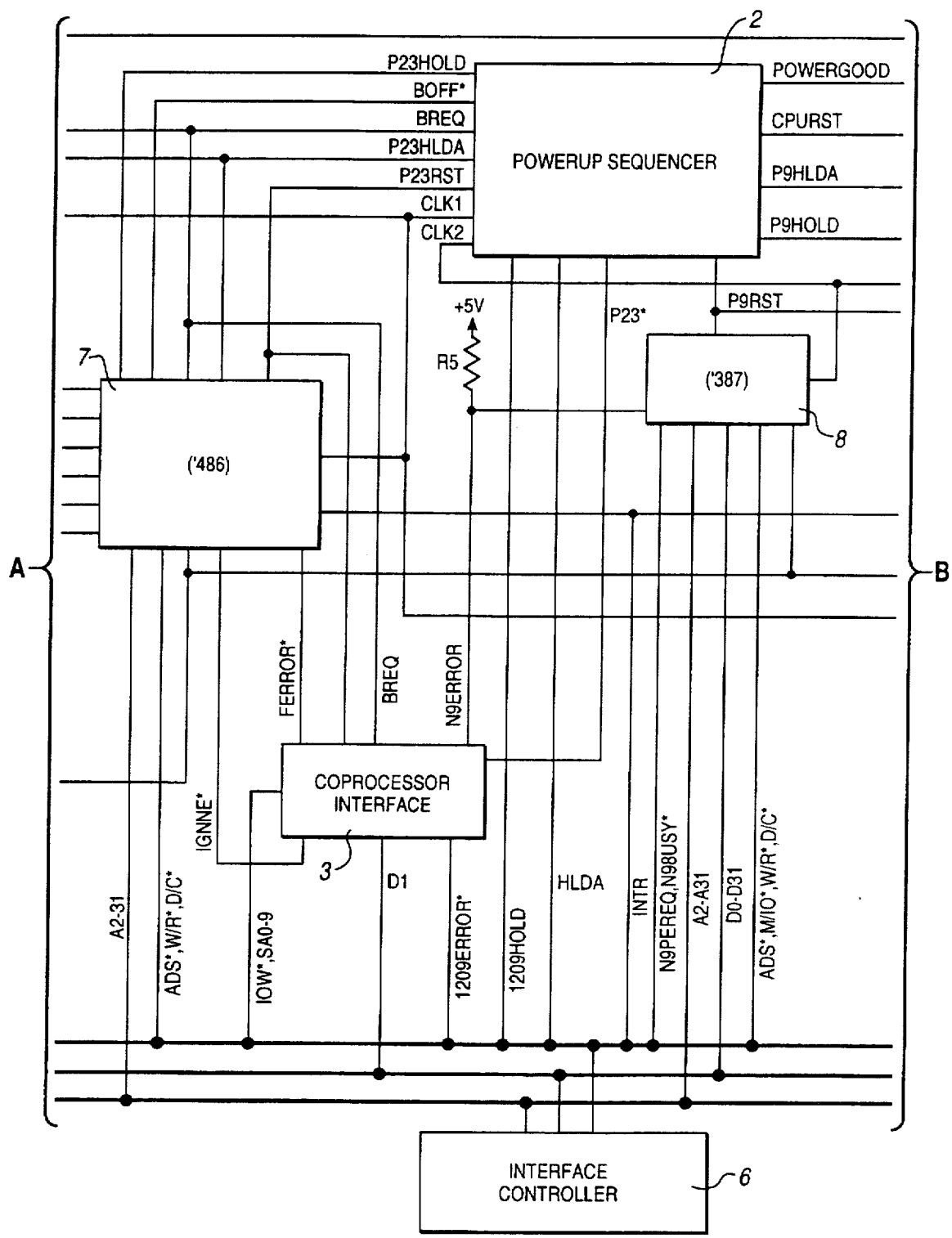
FIG_8B

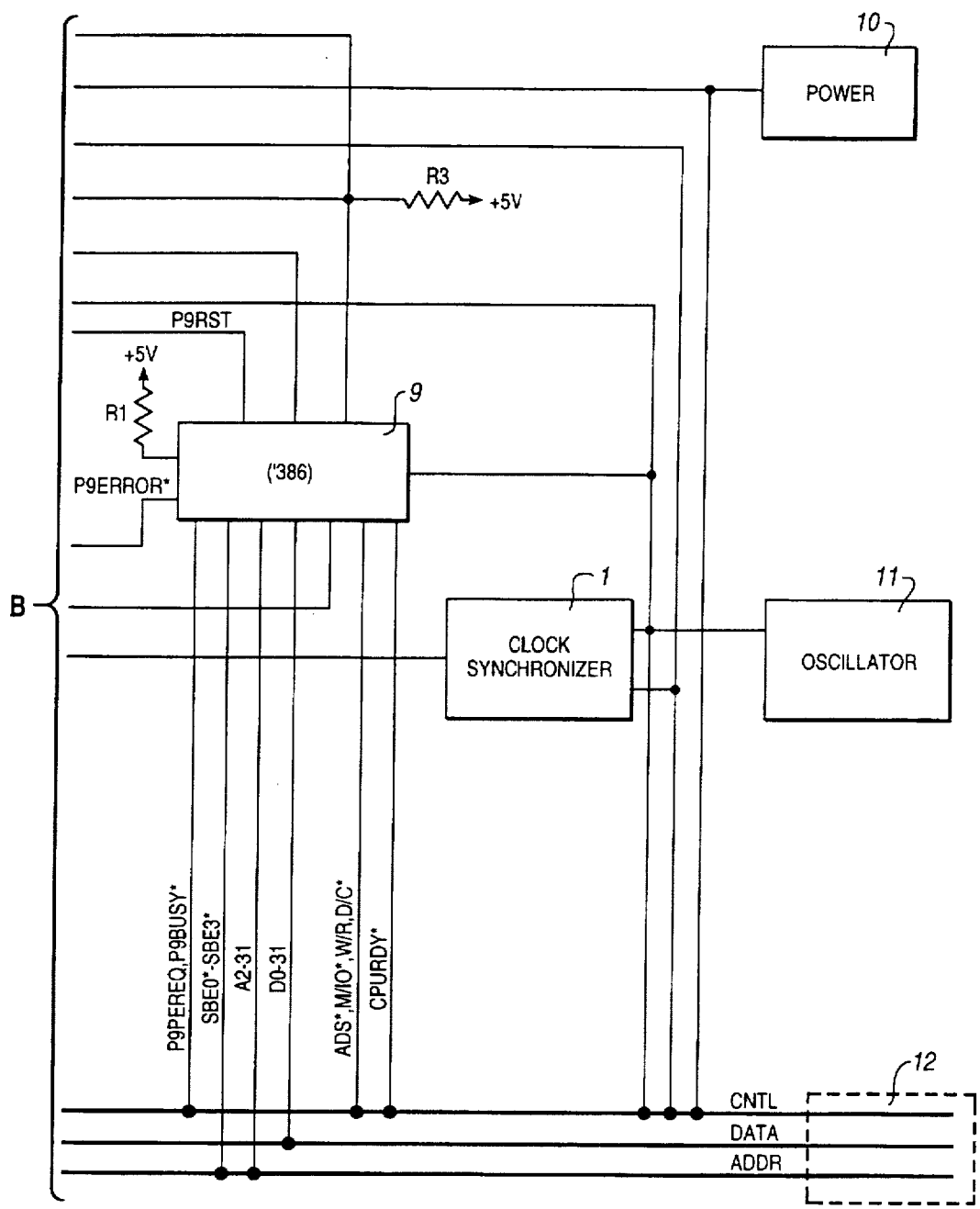
FIG_8C

UPGRADEABLE/DOWNGRADEABLE CENTRAL PROCESSING UNIT CHIP COMPUTER SYSTEMS

CROSS-REFERENCE TO RELATED APPLICATIONS

This application is a continuation-in-part of commonly assigned patent application U.S. Ser. No. 07/998,879, filed Dec. 28, 1992, now U.S. Pat. No. 5,455,927, which is a continuation of U.S. Ser. No. 07/748,780, filed Aug. 22, 1991, now abandoned, and a continuation-in-part U.S. Ser. No. 08/28,056, filed Mar. 8, 1994, now U.S. Pat. No. 5,551,012 which is a continuation of U.S. Ser. No. 07/872,611, filed Apr. 22, 1992, now abandoned, which is a CIP of U.S. Ser. No. 07/689,317, filed Apr. 22, 1991 abandoned. All of these applications are incorporated herein by reference for all purposes.

BACKGROUND OF THE INVENTION

This invention relates in general to a data processing system capable of operating with different types of central processing units (CPU).

New microprocessors are introduced at an increasingly faster and faster pace that it seems a new model of microprocessor is introduced once every two years or even sooner. As capability and/or speed of newly introduced microprocessors frequently surpass those older products and, as the new microprocessors tend to be more adapted to the needs of the market, they are usually more expensive. But when still newer products are introduced, the prices of these once-new products usually drop drastically.

On the other hand, new application software, which offer more user-friendly and more powerful functions, are introduced almost daily. However, these new software programs typically demand more and more processing power. As a result, users frequently find that their computers are not powerful enough to run new software one or two years after the purchase thereof. Those given the responsibilities of procuring data processing equipment, and users in general, therefore, face a problem: What computer to purchase and when is the most appropriate time to purchase a new computer.

Basic components of a typical data processing system include a central processing unit (CPU), memories, control circuits (e.g. clock generators), and interface circuits (e.g. bus interface). In most personal computers, the CPU resides in a main processor chip, e.g. the Intel 80x86. Because it performs logic and arithmetic functions of the system, the CPU chip is the heart of the system and is a major deciding factor determining a system's capability and performance. If the CPU can be changed, the performance of a system can be improved. It is thus desirable to have a computer that can be upgradeable when new and more powerful microprocessors are introduced.

To make upgrading more economical, the motherboard of some prior art computer systems are modulized so that the CPU and other relevant circuits (e.g. controller circuits) are put onto a special board. The special board can be swapped when a new CPU is introduced. In comparison with buying a whole new computer, upgrading a computer with modulized boards is of course more economical. However, as the associated circuits in the special board still constitute a high percentage of its cost, a substantial waste will still be incurred in upgrading a modulized CPU board.

Modulized CPU boards also take up space, an undesirable result in view of the current demand for smaller and more compact computers.

Currently, the more popular microprocessors used by the industry are the Intel microprocessors model numbers 8086, 80286, 80386, 80486, and 80487SX (80487SX, also known as P23N, is a microprocessor having an internal coprocessor). These Intel computers are sometimes referred to as 80x86 where x represents a different generation of microprocessors.

Some generations have submodels. For example, the 386 series of microprocessors includes 80386SX (also known as P9) and 80386DX and the '486 series of microprocessors includes 80486DX. Moreover, generations of these computers are also classified in accordance with their respective operation clock frequencies. For example, 80386 has submodels that run on 16 MHz, 20 MHz, 25 MHz, and 30 MHz, and 80486 has submodels that run on 20 MHz, 25 MHz, 33 MHz, and 50 MHz. However, the differences between different generations of microprocessors are usually greater than the differences between submodels.

For a motherboard to be able to operate with different types of CPU, the different characteristics of the different types of CPU must be considered. Also in need of consideration are the specifications of an interface controller (such as the Acer M1209 interface controller) which controls the interface between the CPU and system devices.

In addition, for a motherboard to be able to operate with different types of CPU (e.g. 80486 or 80386), the following technical problems must be considered:

(a) Clock Synchronization.

For example, the meaning of "20 MHz" in a model 80386/20 MHz CPU is different from the meaning of "20 MHz" in a model 80486/20 MHz CPU. In a model 80386 CPU, a 40 MHz clock is applied to the CPU chip, and "20 MHz" actually means the frequency of the clock controlling internal operations.

For a model 80486 CPU, "20 MHz" means the clock frequency of the external clock applied to the chip. In other words, the frequency of the external clock with respect to the model 80386/20 MHz CPU is actually double that of the model 80486/20 MHz CPU.

Persons skilled in the art know that a system clock is commonly divided into different phases and that certain system activities, such as reading and storing of information, must occur at certain clock phases.

For example, in a model 80386 CPU, the cycle of the system clock is divided alternately into a phase 1 and phase 2. Some system activities, such as the initiation of a CPU cycle (at which time the Address Status signal ADS# is activated) must occur at phase 1, and other system activities, such as reading the CPU Ready signal (CPURDY#) (which signals the end of a CPU cycle) must be performed when phase 2 is changed to phase 1. For 80486 and 80386 to be able to operate in the same motherboard, clock phase problems must be solved.

(b) Signal contention at the system bus.

Most CPUs go through initialization before they can begin normal operation. The initialization typically begins when an external signal (for example, the CPURST in the 80x86 chips) is applied. The external signal causes the CPU to enter into RESET whereby the CPU pins are set to certain levels (i.e. high "1", low "0", floating "F" or undefined).

An external HOLD signal can be applied to cause certain pins of the 80386 to float and be electrically isolated from the bus. But some microprocessors such as the 80386 will ignore the HOLD signal at RESET. For other microprocessors such as the 80486, the pins can be floated either by applying the HOLD signal or by setting the BOFF# signal to "0" (80386 does not have the BOFF# pin).

For a motherboard to be able to operate when two different types of microprocessors, such as a 80486 and a 80386, are present (so that the system can operate with either one of the two microprocessors), signal contention at the bus must be prevented. Prevention of signal contention can be prevented by performing a power-up sequence to control the CPUs when entering into operation, taking into consideration their respective special characteristics.

(c) Coprocessor interface

Some microprocessors such as the 80386 have a coprocessor (i.e. 80387) which resides in a separate chip. The main processor 80386 must issue a coprocessor cycle in order to communicate with its coprocessor. In other microprocessors such as models 80487SX and 80486DX CPU, the coprocessor is internal to the main processor chip and the main processor of these models of CPU can communicate directly with its internal coprocessor.

In many microprocessor designs, the coprocessor must interface with an interface controller (which provides interface between the CPU and other system components. Different coprocessors interface differently with the interface controller. As a result, the interface signals between a CPU and the interface controller are different (for example, interface signals in the 80486 are Floating Point Error ("FERR#") and Ignore Numeric Error ("IGNNE#"), whereas interface signals in the 80386 are N9BUSY#, N9ERROR#, and N9PEREQ, where "N9" represents 80387 and "PEREQ" represents COPROCESSOR REQUEST). Therefore, for an interface controller to be able to work with coprocessors of different microprocessor models, coprocessor interfacing must be provided with the capability to detect and process coprocessor errors of different types of coprocessors.

(d) Different bus sizes and different bus signals.

Data addressing by different types of microprocessors is different. For example, 386SX uses a high portion address (A2–A23) to access units of 16 bits of data (a "word") and a low portion address (A0, A1, BHE#) to access either the whole word, the high byte (8 bits) of the word, or the low byte (8 bits) of the word; however, 80486 uses the high portion address (A2-A31) to access units of 32 bits of data and the low portion address (BE3#, BE2#, BE1#, BE0#) to determine whether the data to be accessed is the whole 32 bits or a 24-bit, 16-bit, or 8-bit portion thereof.

Moreover, some microprocessors such as the 80486 have an internal cache memory. In such types of microprocessor, a cacheable memory read cycle (also called a cache line full cycle) is used to access 128-bit data from external memory.

Therefore, for a motherboard to be able to use different types of CPUs such as either a 80486 or a 80386, bus interfacing must be provided to change and process signals from the different types of CPU.

FIG. 9 is a block diagram of a prior art system 1010. As shown in FIG. 9, the system 1010 is designed with two distinct sockets, the first socket 1001' for 80486SX (80P23) and the second socket 1002' for 80487SX (80P23N). In addition to the CPU clock signal (CLK) from the clock source 1007', all other signals from/to data bus 1100', address bus 1101', and control bus 102' of the 80486SX, are tied to the corresponding signals of the 80487SX. The MP# signal of the 80487SX is tied high to allow the system 1010 to function normally when the 80487SX is not present. When the 80487SX is inserted in the first socket 1001', the MP# signal of the 80487SX drives the BOFF# signal and the FLUSH# signal of the 80486SX active, thus, tristating it. The 80487SX then takes charge of the buses 100', 101', and 102', and the system 1010 works normally.

SUMMARY OF THE INVENTION

This invention provides an upgradeable/downgradeable data processing system capable of operating with different types of central processing units (CPU). The system according to one set of embodiments of the present invention comprises a circuit board having sockets for receiving different types of CPU chips, a clock synchronization circuit for synchronizing clocks of different microprocessor models to the system clock, a power-up sequencer for controlling a CPU in entering normal operation, a coproccessor interface for detecting a coprocessor and for handling errors in coprocessors of different types of CPU, and a bus interface for providing an interface between different types of CPU and the system bus.

The clock synchronization circuit handles clock synchronization problems associated with using different types of CPU. The power-up sequencer prevents signal contention caused by different types of CPU. The coprocessor interface allows different types of CPU to operate with an interface controller which controls other system components. The bus interface can change and process signals between the system bus and different types of CPU.

The computer system according to another set of embodiments comprises a circuit board which has a socket for receiving a processor, a circuit for identifying the model of the processor in the socket and generating an identifying signal, a clock generator responsive to the identifying signal for generating a clock signal acceptable to the identified processor, and circuits responsive to the identifying signal for gating and inhibiting a plurality of input/output signals of the identified processor.

Other objects and technical characteristics of the invention will be understood with reference to the description of the preferred embodiment and the drawings.

BRIEF DESCRIPTION OF THE DRAWINGS

FIG. 1 is a map identifying the spatial relationship of Figs. 1A-1C;

Figs. 1A-1C are block diagrams of part of a computer system in which the present invention is embodied;

FIG. 2 is a diagram of the clock synchronizer of the system shown in Figs. 1A-1C;

FIG. 3 is a diagram of the power-up sequencer within the system shown in Figs. 1A-1C;

FIG. 4 is a diagram of the coprocessor interface within the system shown in Figs. 1A-1C;

FIG. 5 is a map identifying the spatial relationship of FIGS. 5A-5B;

FIGS. 5A-5B are diagrams of the bus interface within the system shown in Figs. 1A-1C;

FIGS. 6A and 6B are diagrams of the timing sequence generated by the clock synchronizer of FIG. 2;

FIG. 8 is a map identifying the spatial relationship of FIGS. 8A-8C;

FIGS. 8A-8C are block diagrams of another embodiment of the present invention;

DESCRIPTION OF THE PREFERRED EMBODIMENT

Figure 6A:
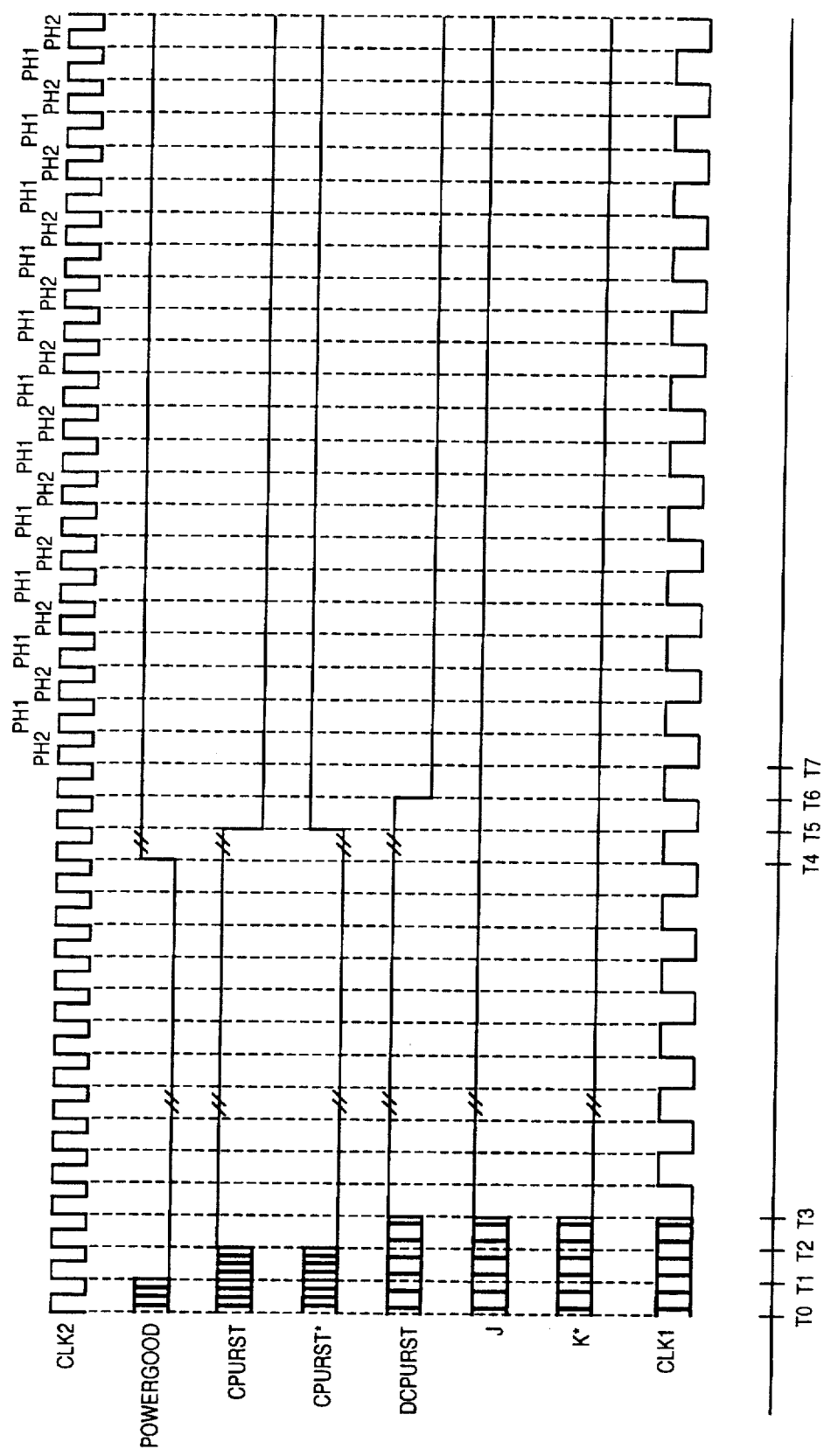

A first set of embodiments of the present invention is described by way of example using 80486 and 80386 chips. A second set of embodiments is described by way of example using 80486SX, 80487SX, and 80486DX chips.
System Architecture FIG. 1 is a map identifying the spatial relationship of FIGS. 1A–1C. FIGS. 1A–1C show a computer system motherboard comprising a clock synchronizer 1, a power-up sequencer 2, a bus interface 15, an interface controller 6, a first CPU socket 9 for plugging in with a first CPU, a coprocessor socket 8 for plugging in with a coprocessor, a second CPU socket 7 for plugging in with a second CPU, a power supply 10, an oscillator 11, and a system bus 12.

The second CPU socket 7, according to this preferred embodiment, is for receiving a CPU chip from the 80486 family, such as 80486SX, 80486DX, and 80486 ('486). The first CPU socket 9, according to this preferred embodiment, is for receiving a CPU from the 80386 family, such as the 80386SX, 80386DX, and 80386 ('386). The coprocessor socket 8 is for receiving a coprocessor chip such as the 80387DX or 80387SX.

Interface controller 6, according to the preferred embodiment, is an ASIC chip such as the Acer M1209 which provides interfacing between the CPU and the system.
System Start Referring to FIGS. 1A–1C, when power supply 10 is turned on and power is supplied to the various parts of the system, oscillator 11 will generate a clock CLK2 that has a certain frequency F2. CLK2 is supplied to the clock synchronizer 1, the power up sequencer 2, the coprocessor socket 8, the first CPU socket 9, and the system bus 12. Through the system bus 12, CLK2 is also supplied to the interface controller 6.

The clock synchronizer 1 receives CLK 2 and produces another CLK1 at frequency F1. This CLK1 from the clock synchronizer is supplied to the power-up sequencer 2, the second CPU socket 7, and the decoder 5 of the bus interface 15. Depending on the requirements of the CPU and other system components such as the interface controller 6, F1 may be faster, slower, or the same as F2. In this preferred embodiment, F2 is equal to two times F1.

Power supply 10 has means for detecting whether or not power in the system is stable. When power supply 10 is turned on and the voltage level of the power supply becomes stable (e.g. when fluctuations in the power level are less than +x % of the voltage value), a power good signal ("POWERGOOD") will be sent to the related units (e.g. the power-up sequencer 2, the interface controller 6). An inactive POWERGOOD (POWERGOOD="0") means that the power supply has not yet been stable.

Interface controller 6 outputs a CPU reset signal (CPURST="1") which is high when power is turned on and before it senses the POWERGOOD="1" signal. Upon sensing POWERGOOD="1", interface controller 6 will drop the CPURST signal to CPURST="110" after it has performed an internal initialization.
Clock synchronization '386 CPUs divide the cycles of CLK2 into two phases, phase 1 and phase 2. Phase 1 and phase 2 are 180° out of phase, that is, when phase 1 is high, phase 2 is low. The cycle that starts after the dropping of the RESET signal (a high-to-low transition of the RESET signal (CPURST)) and every other cycle that follows are identified as phase 2.

Clock synchronization is performed to cause CLK1 to be in-phase with CLK2. "In phase" means that the rising edge of the CLK1 will occur substantially simultaneously with the rising edge of phase 2 of CLK2. The major reason for synchronization is to allow those units (i.e., the powerup sequencer 2, the second CPU socket 7, and the decoder 5) that receive CLK1 to operate in synchronization with the interface controller 6.

The principle of operation of the clock synchronizer 1 is now described with reference to FIG. 2 and the timing diagram of FIGS. 6a and 6b.

The major components of the clock synchronizer 1 are a D-type flip-flop (e.g. 74F74) U1 which is used for delaying CLK2, a NAND gate (e.g., 74F20) U4, and AND gate (e.g., 74F11) U5, and a J-K flip-flop (e.g. 74F109) U2.

The preset input (PR) and the clear input (CL) of the D-type flip-flop U1 are connected to +5 V. The data input (D) receives the CPU reset signal (CPURST) from the interface controller 6. The clock input (C) receives CLK2 from the oscillator 11. The data output (Q) of the flip-flop U1 is a delayed signal (DCPURST) of the CPU reset (CPURST).

NAND gate U4 receives the inverted CPU reset signal (CPURST#) at a first input, the output (Q) of the D-type flip-flop U1 at a second input, and the output (Q) of the J-K flip-flop U2 at a third input. The NAND gate U4 output is connected to the J-input of the J-K flip-flop U2.

AND gate U5 receives the inverted CPU reset signal (CPURST#) at a first input, the delayed CPURST signal (DCPURST) at a second input, and the Q output of the J-K flip-flop U2 at a third input. The output of AND gate U5 is connected to K-input of the J-K flip-flop U2.

The preset input (PR) and the clear input (CL) of the J-K flip-flop U2 are connected to +5 V. Its clock input (C) receives CLK2 from the oscillator 11.

The output of the J-K flip-flop U2 as a function of its inputs is shown in the following logic table:

TABLE 1

| Input (J | K#) | Output (Q) |
|---|---|---|
| 0 | 0 | 0 |
| 0 | 1 | Q |
| 1 | 0 | Q̄ |
| 1 | 1 | 1 |

Because the output signal from the NAND gate U4 and the output signal from the AND gate U5 are at opposite levels, J and K# will not be "o" concurrently or "1" concurrently.

FIG. 6a shows the operation of the J-K flip-flop when CLK1 and CLK2 are in-phase. Between t5 and t6, CPURST#="1" and DCPURST="1"; therefore, if CLK2 is low, J will be "1", K# will be "0", and the output Q of the J-K flip-flop U2 will, as shown in Table 1, continue to toggle at each cycle of CLK2 which is received at its input (C). Thus, the J-K flip-flop U2 will operate as a frequency divider to divide the frequency of CLK2. In other words, the output Q of the J-K flip-flop U2 will have a frequency that is half the frequency of its clock input (C), as shown in FIG. 6a. Accordingly, the frequency of CLK1 is half the frequency of CLK2.

But if CLK2 between t5 and t6 is "1", as shown in FIG. 6b, so that CLK1 is out of phase with CLK2, then J will be "0" and K# will be "1". As shown in Table 1, the output Q of the J-K flip-flop U2 will maintain its previous level. After point t6, however, DCPURST will change to "0", so that J="1", K#="0", and the output Q of the J-K flip-flop U2 will, as shown in Table 1, resume to toggle at each subsequent cycle of CLK2 received at its input (C), at which time CLK1 and CLK2 will already be inphase.

Power-Up Sequence

Since there is a possibility that both the first CPU socket 9 and the second CPU socket 7 will contain a CPU, in which event, the signals from each of the two CPU may result in signal contention at the system bus 12.

Signal contention at the system bus 12 is prevented by controlling the signal levels of the CPUs' pins. Controlling the signal levels of the CPUs' pins is in turn achieved by setting the CPU to a predetermined state.

To set the CPU to a predetermined state, it is first made to go through an internal initialization. For the 80×86 microprocessors, this is performed by applying an external CPU reset signal (CPURST) so as to cause the CPU to enter into RESET. In order to cause a '386 at the first CPU socket 9 to enter into RESET, the power-up sequencer 2 generates a P9RST signal (i.e. P9RST="1") to the '386 in the first CPU socket 9.

Table 2 shows the signal levels at the pins of the '386 at RESET (for example, ADS#="1", D15-D0="F" (floating), BHE#="0", A23-A1="1", and P9HLDA="0").

P9HLDA is actually the HLDA signal of the '386. Because the power sequencer 2 receives a HLDA signal from both the first CPU socket 9 and the second CPU socket 7, this signal is named P9HLDA to more distinctly point out that it is the HLDA signal from the '386. Similarly, the HOLD signal is renamed P9HOLD for the same purpose.

P9HLDA (i.e., HLDA) is connected to +5 V through a resistor R3, but when '386 enters into RESET, P9HLDA will change from "1" to "0".

TABLE 2

| Pin name | signal state of '386 at reset |
| --- | --- |
| ADS# | 1 (high) |
| D15-D0 | F (float) |
| BHE# | 0 (low) |
| A23-A1 | 1 (high) |
| W/R# | 0 (low) |
| D/C# | 1 (high) |
| M/IO# | 0 (low) |
| LOCK# | 1 (high) |
| P9HLDA (HLDA) | 0 (low) |

Similarly, to cause '486 in the second CPU socket 7 to enter into RESET, a P23RST signal (P23RST="1") is applied from the power-up sequencer 2 to the '486.

Table 3 lists the signal levels of the pins of a '486 (e.g. 80486SX) at RESET. As shown in Table 3, at RESET, the logic states of A31-A2, BE3#-BE0#, PCD, M/IO#, D/C#, W/R#, BLAST#, and FERR# are undefined, D31-D0 are in high impedance state, LOCK# and ADS# are in logic "1", and BREQ and P23HLDA are in logic "0".

TABLE 3

| PIN names | pin level when HOLD and BOFF# are inactive and 486SX is in reset |
| --- | --- |
| A31-A2 | Undefined |
| BE3#-BE0# | Undefined |
| PCD | Undefined |
| M/IO# | Undefined |

TABLE 3-continued

| PIN names | pin level when HOLD and BOFF# are inactive and 486SX is in reset |
| --- | --- |
| D/C# | Undefined |
| W/R# | Undefined |
| BLAST# | Undefined |
| FERR# | Undefined |
| D31-D0 | high impedance |
| LOCK# | 1 (high) |
| ADS# | 1 (high) |
| BREQ | 0 (low) |
| P23HLDA (HLDA) | 0 (low) |

P23HLDA is actually the HLDA signal of the '486. Because the power sequencer 2 receives a HLDA signal from both the first CPU socket 9 and the second CPU socket 7, this signal is named P23HLDA to more distinctly point out that it is the HLDA signal from the '486.

The BREQ pin of the second CPU socket 7 is connected to the power-up sequencer 2. The BREQ is pulled high to +5 V via a resistor R2 so that if no CPU is plugged into this second CPU socket 7, the BREQ pin will be high. But when a CPU chip is plugged in and when it is at RESET (i.e. when P23RST="1" is sent by the power-up sequencer 2), the level of BREQ will be "0". From the "0" level of BREQ at reset, one can then ascertain that the second CPU socket 7 is plugged in with a '486.

A person skilled in the art will understand that besides HLDA, other pins, such as HLDA, LOCK#, and ADS# may also be used for purposes of ascertaining whether a CPU chip is plugged into the socket. However, if a pin such as LOCK# or ADS# is used, then such pin should be pulled to an appropriate level.

To float the output pins of the '386, the power-up sequencer 2 sends P9HOLD="1" to the first CPU socket 9. Upon receiving P9HOLD="1", the '386 in the socket will enter into HOLD and will return P9HLDA="1" to the power-up sequencer 2 in order to notify the power-up sequencer 2 that '386 has entered into HOLD.

The logic levels of the pins of the '386 in HOLD are listed in the following Table 4:

TABLE 4

| Pin Names | Signal state |
| --- | --- |
| HLDA | High "1" |
| LOCK#, M/IO# | Float |
| D/C#, W/R# | Float |
| ADS#, A23-A1 | Float |
| BHE#, D15-D0 | Float |

Floating output pins of '486 can be achieved by setting it to HOLD. The condition under which '486 can be put to HOLD is different from that of '386. When '486 is in RESET (P23RST="1"), it can receive BOFF#="0" anytime to enter into the HOLD state. On the other hand, '386 must have exited the RESET (P9RST="0") before a P9HOLD="1" can cause it to enter into HOLD.

Moreover, putting '486 to HOLD can be done by applying either P23HOLD="1" (as with the '386 ) or BOFF#="0". ('386 does not have an input pin for BOFF#.) But if the P23HOLD is used, '486 will return a P23HLDA signal, which will be sent to various system units such as the power-up sequencer 2 and the interface controller 6. Since the P23HLDA, if sent to the other units, may cause misinterpretation and produce unexpected results, putting the '486 into HOLD in this preferred embodiment is thus performed by setting BOFF#="0", which will not cause '486 to return a P23HLDA signal. Another advantage with using the BOFF#="0" signal is that once it is received, '486 will enter into HOLD immediately.

When '486 enters into HOLD state, its pins will have the levels listed in the following Table 5.

TABLE 5

| Pin name | Signal state |
|---|---|
| A2-A31 | Float |
| D0-D31 | Float |
| BE0#-BE3# | Float |
| ADS# | Float |
| M/IO# | Float |
| D/C# | Float |
| W/R# | Float |
| BLAST# | Float |
| LOCK# | Float |
| PCD | Float |
| BREQ | not float |
| P23HLDA (HLDA) | not float |
| FERR# | not float |

By comparing Table 4 with Table 5, it can be seen that when one of the CPUs ('386 or '486) in the system is in HOLD, the output pins of the HOLDed CPU, which otherwise would have conflicted with pins of the other CPU, will be floated, and signal contention at the system bus 12 will be prevented.

With reference to FIGS. 3, 7, and 1A–1C, when power is supplied from the power supply 10, POWERGOOD="0" will be sent from the power supply 10 to the power-up sequencer 2 and the interface controller 6. The interface controller 6, in response to the POWERGOOD="0", sends CPURST="1" to the power-up sequencer 2. In response to CPURST="1", power-up sequencer 2 generates P23RST="1" to '486 and P9RST="1" to '386.

As shown in Tables 2 and 3, when '486 and '386 are both in RESET (P23RST=P9RST="1"), there will be signal contention between the pins of '486 and the pins of '386. Therefore, when power-up sequencer 2 receives P23RST="1", it sends BOFF#="0" to the '486 to cause the '486 to enter into HOLD. Referring to FIG. 3, P9RST="1" is also generated, but it is delayed by a delay circuit U8 (a 74F174). The reason for causing the '486 to enter into HOLD (P23RST="1" and BOFF#="0") first when the '386 is in RESET is to prevent signal contention between the pins of the '386 and the pins of '486. Another reason is '386, when it is in RESET, cannot enter into HOLD state directly as can the '486.

Figure 7:
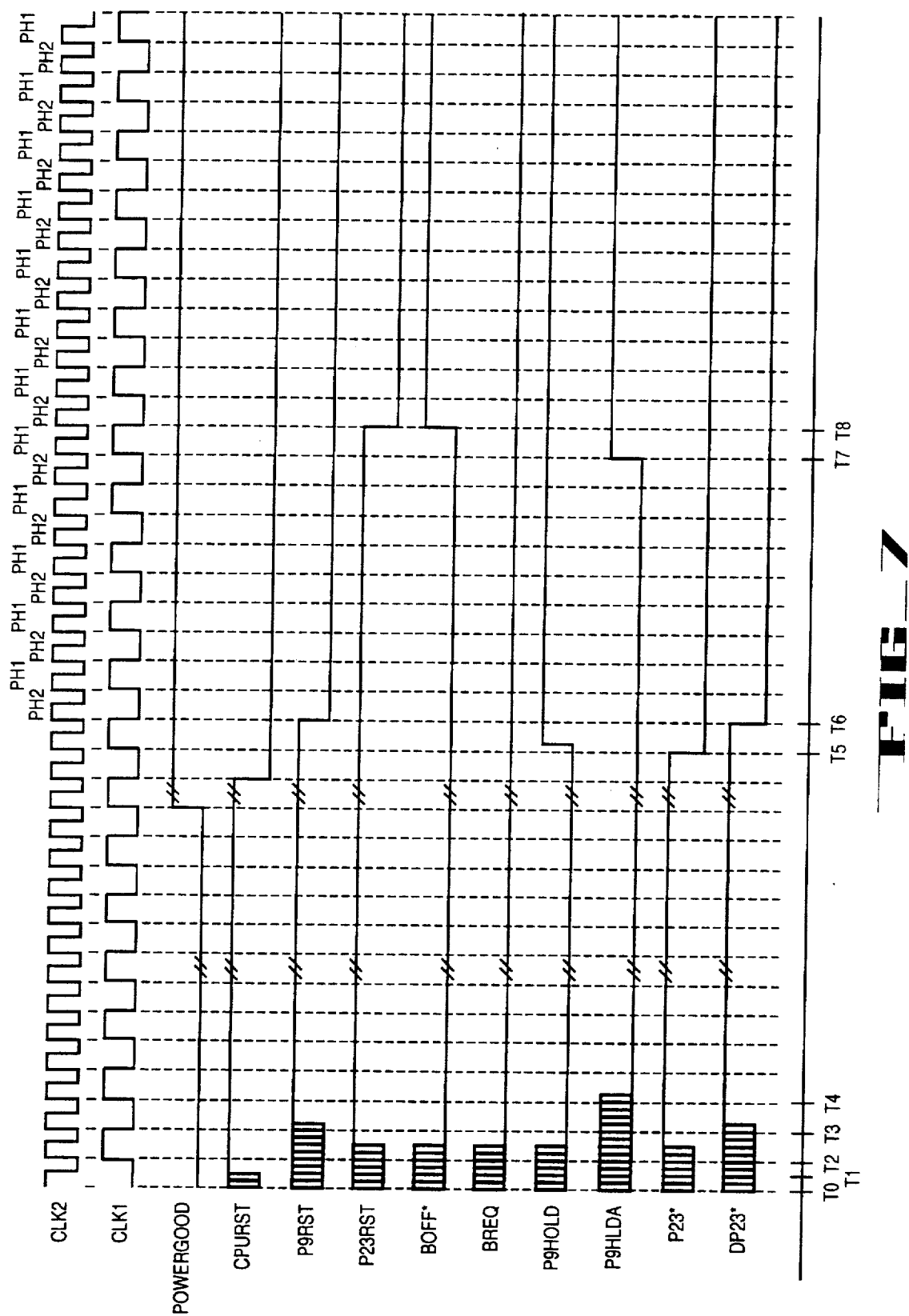
FIG. 7 is a diagram of the timing sequence of the power-up sequencer.
Figure 9:
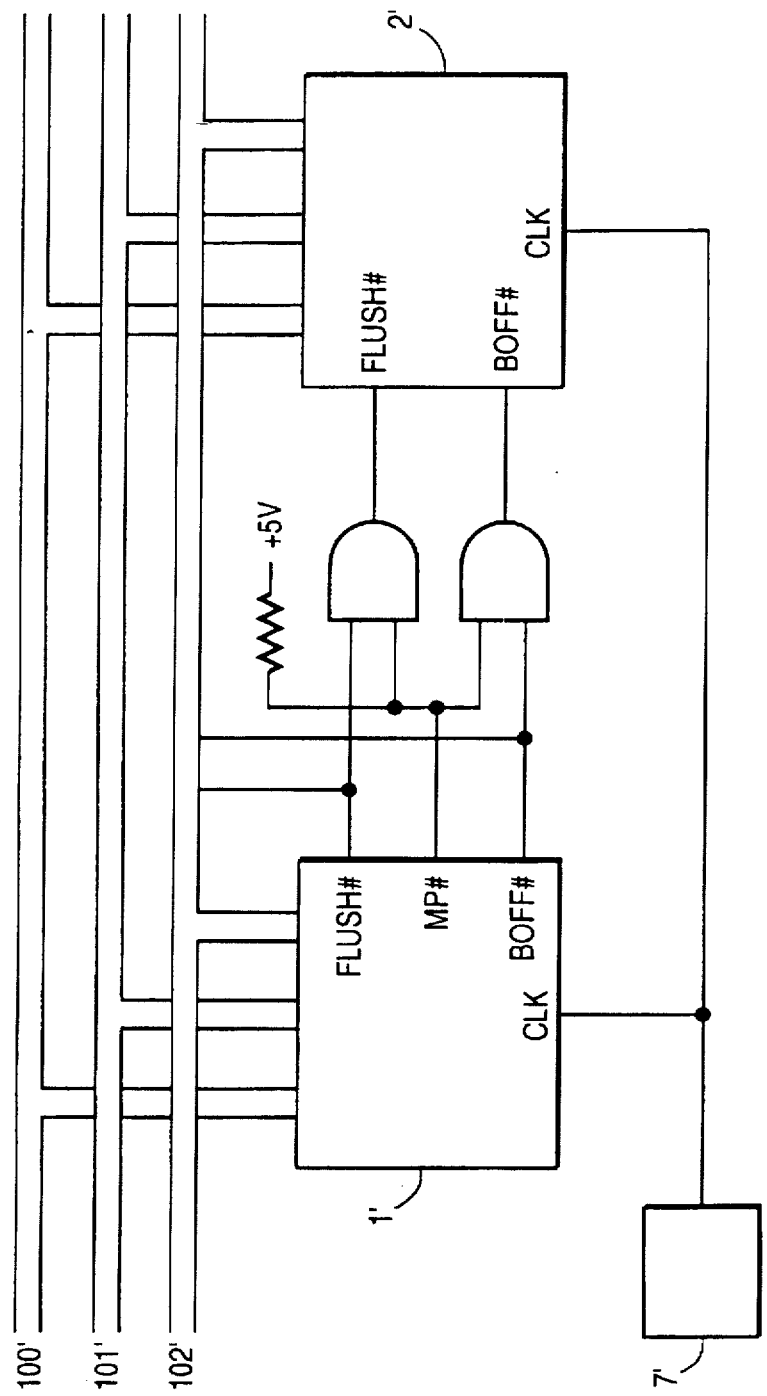
FIG. 9 is a block diagram of a prior art circuit.

With reference to Table 2 and FIGS. 3 and 7, when '386 is in RESET (P9RST="1"), P9HLDA="0" and HLDA from the power-up sequencer 2 to the interface controller 6 will be "0".

From Tables 3 and 5, it can be seen that when the second CPU socket is plugged in with a '486 chip and when this '486 enters into HOLD (P23RST="1", BREQ="0"), BREQ will be "0". This BREQ="0" signal is sent to the power-up sequencer 2.

As described above, when the interface controller 6 receives POWERGOOD="1", (meaning that power supply is stable), the interface controller 6 will send a CPURST= "0" to the power-up sequencer 2. When the power-up sequencer 2 senses CPURST="0" and BREQ="0", it knows that there is a '486 in the second CPU socket 7. A timing control logic means U7 (116R8PAL) in the power-up sequencer 2 will set P23#="0" to inform the system, including the coprocessor interface 3, that there is a '486 in the system. DP23#="0" also causes the power-up sequencer 2 to generate the P9HOLD signal to the first CPU socket to put the '386 into HOLD. In addition, the timing control logic means U7 (16R8PAL) generates a delay signal DP23#"0" to the clear input (CL) of delay circuit U8 (74F174) and signals that there is a '486 in the system. P23#="0" also resets the output P9RST of the delay circuit to "0". By resetting P9RST from "1" to "0", '386 can leave RESET.

When '386 receives P9HOLD="11" from the power-up sequencer 2 (for requesting the '386 to enter HOLD), it will return P9HLDA="1" if it is ready to enter into HOLD. In HOLD, '386 will release control of the system bus 12. When power-up sequencer 2 receives P9HLDA="1", it will change P23RST from "1" to "0" and BOFF# from "0" to "1" to release '486 from HOLD and allow '486 to go into normal operation. The result is that '386 is in HOLD and the system now operates with a more powerful CPU '486.

Coprocessor Interface

As shown in FIGS. 1A–1C, signals among the '386, '387, and interface controller 6 comprise:

for '386: ADS#(O), M/IOf(O), W/R#(O), A23(0), A2(O) CPURDY#(I), P9ERROR#(I), P9BUSY#(I), P9PEREQ(I) and D0-D15(I/O);

for '387: ADS#(I), M/IO(I), W/R#(I), A23(I), A2(I), CPURDY#(I), N9RDY#(O), N9ERROR#(O), N9BUSY# (O), N9PEREQ(O), and D0-D15(I/O);

for the interface controller 6: ADS#(I), M/Io#(I), A23(I), CPURDY#(I), N9RDY#(I), N9ERROR#(I), N9BUSY#(O), N9PEREQ(I), P9BUSY#(O) and P9PEREQ(O).

("0" means output, "1" means input. I/O means input/output).

N9ERROR# is connected to a +5 V via a resistor R5 (i.e., it is pulled high). If a '387 is not plugged in, N9ERROR# will be high. When a '387 is plugged in and if it receives P9RST="1", it will set N9ERROR# to "0". Therefore, by detecting the level of N9ERROR# after P9RST="1", the presence/absence of '387 can be detected.

For N9ERROR# to change "0" to "1", an initial command such as FNINIT can be sent from the '386 to the '387 to initiate the '387 to a known state in which N9ERROR# is set to "1". In the preferred embodiment, the interface controller 6 uses the falling edge of the CPURST signal to latch N9ERROR#. If the latched N9ERROR# is "0", then there is a '387 in the system. Conversely, if the latched N9ERROR# is "1", then the system does not have a '387.

'387 operations are initiated when it receives command or data (or operand) from the '386. In executing coprocessor instructions, the '386 will initiate a coprocessor cycle, which is defined as when ADS#="0", M/IO#="0", and A23="1" (or A31="1" if the '386 is a 386DX). When '387 detects the above signals (ADS#="0", M/IO="0", and A23="1"), it will use the A2 signal to determine whether a command (A2= "0") or data (A2="1") is transferred in this coprocessor cycle. The direction of the transmission 30 is determined by the W/R# signal. If W/R# is "0", that means '386 will read information from '386 and if W/R# is "1", that means '386 will send information to the '387.

A coprocessor cycle ends when '387 sends N9RDY#="O" to the interface controller 6 and the interface controller 6 then sends CPURDY#="O" to 35 inform the '386 that the coprocessor cycle is ending. (Any cycle initiated by the '386 is terminated by a CPURDY#="O" to the '386.) A coprocessor cycle comprises a command phase (which is used for transmitting command) and an operand phase (which is used for transmitting data or operand). In executing coprocessor instruction, if '386 must 40 transmit an operand, it will first save the address of the operand into an internal data pointer (not shown in the figure), then initiate the command phase (A2="0") of a coprocessor cycle, and also send the command to the '387.

In general, '386 will check the level of P9BUSY#="0l" before it sends a command to '387. P9BUSY#="0" means that the '387 is busy and cannot receive another command. On the other hand, P9BUSY#"1" means that the '387 is not busy and can receive a command from the '386. When '387 receives a command, it will set N9BUSY# to "0".

If '387 wants to send information, it will set N9PEREQ to "1" and send it to the interface controller 6. Upon receiving N9PEREQ="1", the interface controller 6 sends P9PEREQ="1" to the '386. When '386 detects P9PEREQ="1", it will initiate an operand phase of a coprocessor cycle to read data from the '387 to a '386 internal register.

If a coprocessor '387 exists, it will send N9RDY#="0" to the interface controller 6 when execution of the command from the '386 finishes. Interface controller 6, upon detecting a coprocessor cycle (ADS#="0", M/IO="0", A23="1") and upon receiving N9RDY#="0", will then send CPURDY#="0" to inform the '386 to terminate the coprocessor cycle. On the other hand, if there is no coprocessor in the system, the interface controller 6, upon detecting a coprocessor cycle, will initiate an internal state machine to send CPURDY#="0" to the '386 to terminate the coprocessor cycle.

When '387 is executing a command from the '386, it will send N9BUSY="0" to the interface controller 6. Interface controller 6 will then send P9BUSY#="0" to '386 to indicate that '387 is busy and to inform the '386 not to initiate another coprocessor cycle. Thus, the '386 cannot execute another coprocessor instruction.

If there is a coprocessor error when '387 is executing a command from the '386, '387 will send N9ERROR="0" to coprocessor interface 3. Coprocessor interface 3 will then set 1209ERROR#="0" to inform the interface controller 6 that an error has occurred.

When '387 has an error, it will change N9BUSY# from "0" to "1". Bus N9BUSY#="1" also means that '387 is not busy and can accept a command from the '386. In order not to let '386 mistakenly execute another coprocessor cycle before the removal of a coprocessor error, interface controller 6, when notified of a coprocessor error (N9BUSY#="1", 1209ERROR#="0"), will not change P9BUSY# from "0" to "1" but will keep P9BUSY# at "0" so as to prevent '386 from executing another coprocessor cycle. Moreover, interface controller 6 will also send an interrupt (INSTR="1") to '386 to request the '386 to process the coprocessor error.

When '386 receives INSTR="1", it will execute a coprocessor error handling routine if the interrupt is caused by a coprocessor error. The error handling routine may display, for example, the coprocessor error. The routine may also use an output port to cause the interface controller 6 to set P9BUSY# back to "1", so that '386 can initiate a '387 command (e.g. FNINIT) to set N9ERROR#="1" to the coprocessor interface 3.

In response to N9ERROR#="1", coprocessor interface 3 sets 1209ERROR#="1" to the interface controller 6 to inform that the coprocessor error has been removed. The interface controller 6 will then change INSTR from "1" to "0" to terminate the interrupt; now '386 is ready to resume operation.

To determine whether its coprocessor exists, '386 executes a coprocessor program and compares the results of the execution against prestored results. If the comparison is positive, that means a '387 is plugged in. If the comparison is negative, then no '387 is plugged in. If a '387 is plugged in, '386 will set the value of a control register (CW) to a certain value so as to allow the '386 to initiate coprocessor cycles.

If no '387 is plugged in, '386 will set the control register (CW) to a different value. The '386 will be prevented from initiating a coprocessor cycle when a coprocessor instruction is encountered and instead will generate an interrupt request so that the coprocessor instruction can be handled by an interrupt service routine.

'486 products include 486SX, 486DX, and 487SX. With the exception of 486SX, the coprocessor in the other '486 products is internal to the CPU chip. By ascertaining whether the '486 is a 486SX or not, one can determine whether the CPU has an internal coprocessor or not. Ascertaining whether the '486 is a 486SX can be achieved by executing a coprocessor instruction such as FNINIT and then comparing the value of a control register CW with a predetermined value. If the comparison is positive, then the '486 is a 486SX.

If the '486 is a 486SX, then it will generate an internal interrupt and transfer control to an interrupt handling routine when it executes a coprocessor instruction. However, if the '486 is not a 486SX (and therefore has an internal coprocessor), the internal coprocessor will be enabled to allow the '486 to communicate directly with the internal coprocessor. As a result, the '486 need not execute an external coprocessor cycle when executing coprocessor instructions.

FIG. 4 is a diagram of a preferred implementation of the coprocessor interface 3. As shown in FIG. 4, the basic output signals of the coprocessor interface 3 are 1209ERROR# and IGNNE#.

When the CPU is in RESET (CPURST="1"), the 1209ERROR# signal can be used to indicate whether a coprocessor exists (e.g., when 1209ERROR#="0", that means a coprocessor exists). During normal operating condition (CPURST="0"), 1209ERROR# is used to indicate whether a coprocessor error has occurred (if there is a coprocessor error, then 1209ERROR="0", if there is no coprocessor error, then 1209ERROR="1").

IGNNE# is an input signal to the '486. In normal operation, IGNNE#="1" means that a coprocessor error has occurred when '486 is processing a coprocessor instruction, and the '486 can no longer continue executing the coprocessor instruction. '486, by executing a coprocessor error handling routine, can change IGNNE# from "1" to "0" by writing to an input port.

The operation of the coprocessor interface 3 is explained with reference to FIG. 4. As shown, the coprocessor interface 3 comprises a first OR gate (774F32, U127A), a second OR gate (74F32, U127B), a third OR gate (74F32, U127C), an AND gate (74F11, U107), an input/output port U53, and a flip-flop (74F74, U109).

Referring to the first OR gate U127A, as previously described, P23# will be set to "1" when there is no '486 in the system. N9ERROR# will be "O" when there is a 387X and when the 387X is in RESET (P9RST="1"). Thus, 1209ERROR# will be "0" and P23# will be "1" when the system has a '387 and no '486.

If there is a '486 in the system, BREQ will be "0" when '486 is in RESET (P23RST="1"). The second OR gate 127B will thus output a "0". The AND gate will therefore output 1209ERROR#="0" when there is a '486.

If the '486 is a CPU (e.g. a 486SX) that does not have an internal coprocessor (e.g. 486DX), then 1209ERROR# will be "0", and the interface controller 6 will know that a coprocessor exists. As 486SX will not issue a coprocessor cycle, there will be no conflicting results.

For systems that only have '387 and not '386, the interface controller 6 will be informed of a coprocessor error when P23#="1" and 1209ERROR#="0". As previously described, the interface controller 6 will send an interrupt request INTR="1" to the '386 to request the '386 to process the coprocessor error.

In systems that have a '486, when there is no coprocessor error in the '486, FERR# to the third AND gate U127C will be "1", this signal will be inverted into "0" by the inverter U111 which is then input to the preset input (PR) of flip-flop U109. As a result, the output of the flipflop U109 will be preset to "1", that is, IGNEE#="1". Note that if the '486 is a 486SX, the P23NEN# signal to the third AND gate U126 is set to "1" by the input/output port U53. If the '486 has an internal coprocessor, P23NEN# will be "0", '486 errors which may be caused by the unstable state of FERR# are prevented.

When there is a coprocessor error in a '486 which has an internal coprocessor, FERR#="0" and P23NEN#="0", the signal input to pin 5 of the AND gate U107 will be "0". As a result, output of the AND gate 107 will be "0", which means that 1209ERROR# will be "0". The interface controller 6 is thereby informed that there exists a coprocessor error. Interface controller 6 then sends INTR="1" to the '486 to request the '486 to process the coprocessor error.

When the '486 receives INTR="1", if it ascertains that a coprocessor error has occurred, it will execute a coprocessor error handling routine. The coprocessor handling routine can, for example, display the coprocessor error, or it can send a FOWR="0" signal through the I/O port (with SA0SA10 and IoW#) to the clear input (CL) of flip-flop U109 to clear IGNNE# to "0".

When '486 senses IGNNE#="0", it can once again execute coprocessor instructions. By executing coprocessor instructions, the '486 will set FERR# from "0" to "1", thereby presetting flip-flop U109 to change IGNNE# back to "1" and changing 1209ERROR# to "1". The interface controller 6 will, as a result, change INTR from "1" to "0" so as to remove the coprocessor error in the '486 and terminate interrupt request to the '486 in order to resume normal operation.

Bus Interface

FIG. 5 is a map identifying the spatial relationship of FIGS. 5A–5B. FIGS. 5A–5B are diagrams of one implementation of the bus interface. 386sx uses the high portion address (A2–A23) to access 32-bit units of information. It uses Aa of the low portion address (A0, A1, BHE#) to select either a high or a low word from the accessed 32-bit unit. It uses A0 and BHE# to select either a word, a low 8-bit byte, or a high 8-bit byte.

'486 uses the high portion address (A2–A31) to access 32-bit units (D0–D31) of information. It uses the low portion address (BE3#, BE2#, BE1#, BE0#) to determine whether to access the whole 32 bits, or 24 bits, 16 bits, or 8 bits therefrom.

'486 has a high speed cache into which '486 stores a unit of 128 bits of information accessed from the external memory in one cache read cycle.

In addition, as previously described, when the system has both a '386 and a '486, certain pins of either the '386 or '486 must be put into a float state or their outputs become inhibited so as to prevent signal contention.

Therefore, for a motherboard to be able to operate with either a '486 or '386, a bus interface must be provided to convert and process signals from one type of CPU so that they can be used with another type of CPU.

External activities of the CPU are executed in CPU cycles. A CPU cycle is terminated by a CPURDY="0" signal sent from outside of the CPU (e.g. interface controller 6). Tasks to be executed by a *486 in a CPU cycle are defined by M/IO#, W/R#, and D/C# as listed in Table 6.

TABLE 6

| M/IO# | W/R# | D/C# | Task definations |
|-------|------|------|------------------|
| 0 | 0 | 0 | Interrupt acknowledge |
| 0 | 1 | 0 | special cycle |
| 0 | 0 | 1 | read data from I/O |
| 0 | 1 | 1 | write data to I/O |
| 1 | 0 | 0 | prefetch instructions |
| 1 | 1 | 0 | X X X |
| 1 | 0 | 1 | Read data from memory |
| 1 | 1 | 1 | write data to memory |

The interface controller 6 and the system bus 12 can be 16 bits or 32 bits long. For a '386 system with a system data bus 12 of 16 bits long, the high portion address (A2–A23) is used to address units of 32 bits of data, A1 of the low portion address is used to address either the high word or the low word from the 32-bit data, and A0 and BHE# are used to determine whether to access a word, the high 8-bit byte, or the low 8-bit byte. The preceding data access is listed in Table 7.

TABLE 7

| A1 | A0 | BHE# | Access mode | data size |
|----|----|------|-------------|-----------|
| 1 | 0 | 0 | high word | D0-D15 |
| 1 | 0 | 1 | high word low byte | D0-D7 |
| 1 | 1 | 0 | high word high byte | D8-D15 |
| 1 | 1 | 1 | X | X |
| 0 | 0 | 0 | low word | D0-D15 |
| 0 | 0 | 1 | low word low byte | D0-D7 |
| 0 | 1 | 0 | low word high byte | D8-D15 |
| 0 | 1 | 1 | X | X |

When the system data bus 12 is 32 bits long, the high portion address (A2–A31) is used to access units of 32 bits of data (D0—D31), and the low portion address (BE0#, BE1#, BE2#, and BE3#) is used to access either the whole 32 bits or 24 bits, 16 bits, or 8 bits thereof. 24 bits from the 32-bit unit can be accessed either as D0–D23 or as D8–D31. 16 bits from the 32-bit data can be accessed either as D0–D15, D8–D23, or D16–D31. 8 bits from the 32-bit unit can be accessed as D0–D7, D8–D15, D16–D23, or D23–D31. The data access described above is more clearly shown in Table 8.

TABLE 8

| BE3# | BE2# | BE1# | BE0# | access length | Data accessed |
|------|------|------|------|---------------|---------------|
| 0 | 0 | 0 | 0 | 32 bit | D0-D31 |
| 0 | 0 | 0 | 1 | 24 bits | D8-D31 |
| 1 | 0 | 0 | 0 | 24 bits | D0-D23 |
| 0 | 0 | 1 | 1 | 16 bits | D16-D31 |
| 1 | 0 | 0 | 1 | 16 bits | D8-D15 |
| 1 | 1 | 0 | 0 | 16 bits | D0-D15 |
| 0 | 1 | 1 | 1 | 8 bits | D24-D31 |
| 1 | 0 | 1 | 1 | 8 bits | D16-D23 |

TABLE 8-continued

| BE3# | BE2# | BE1# | BE0# | access length | Data accessed |
|------|------|------|------|---------------|---------------|
| 1 | 1 | 0 | 1 | 8 bits | D8-D15 |
| 1 | 1 | 1 | 0 | 8 bits | D0-D7 |

Under normal operation, '486 initiates a CPU cycle to access either 32 bits, 24 bits, 16 bits, or 8 bits of information. But when connected to a system with a 16-bit data bus, '486 cannot use its 32-bit internal bus (HD0–HD31) to access 32 bits of data. In this case, according to the specifications of '486, an input pin (BS16#) of the '486 must first be pulled low, so that '486 can automatically set its data bus (HD0–HD31) to either a low word portion (HD0–HD15) or a high word portion (HD16–HD31).

But in such a case, if '486 wants to access 32 bits of data, it will initiate two CPU cycles, the first CPU cycle to access the low word portion (HD0–HD15) and the second CPU cycle to access the high word portion (HD16–HD31). If the '486 wants to access 24 bit data at HD0–HD23, then '486 will initiate two CPU cycles, the first CPU cycle to access HD0–HD16 and the second CPU cycle to access HD16-HD24. But if the 24-bit data is in HD8-HD31, then the first CPU cycle will be used to access HD8–HD15 and the second CPU cycle will be used to access HD16–HD31.

If '486 wants to access 16 bits of data at HD0–HD15, it will use one CPU cycle to access HD0–HD15. And if the 16 bits of data is a HD16–HD31, 486 will also use one CPU cycle to access it. If the '486 wants to access 8 bits of data, it will only use one CPU cycle to access the data using the address of the 8-bit data (e.g., HD24–HD31, HD16–HD23, HD8–HD15, HD0–HD7). '486 has an internal cache of 8 kilobytes. The cache is arranged into 512 lines each with 128 bits. Cache operations will result in either a "cache read hit", a "cache read miss", a "cache write hit", or a "cache write miss".

"Cache read hit" and "cache write hit" mean that the data accessed by the '486 is already in the cache and can be accessed directly without having to execute a memory read cycle (e.g. to the interface controller 6) to access such data from external memory.

'486 has an input pin, KEN#. When '486 issues a memory read cycle to the external memory and KEN# is set to "0", that means that the cycle is a "cacheable memory read cycle" (also called a "cache line fill cycle"). "Cacheable memory read cycle" means that when a CPU reads data from the external memory, such data will also be put into the cache.

When '486 issues a memory read cycle to the external memory and KEN# is set to "1", that means the cycle is a non-cacheable memory read cycle. "Non-cacheable memory read cycle" means that when a CPU reads data from the external memory, such data will not be put into the cache. In "non-cacheable memory read cycle", '486 can use high portion address (A2–A31) and low portion address (BE3#-BE0#) to access 32 bits, 24 bits, 16 bits, or 8 bits of data and need not store that data into the cache.

"Cache read/write cycle" means the '486 is accessing 128 bits of data from the external memory. If only 32 bits of data are accessed with each memory cycle, then '486 will have to issue 4 memory read cycles to complete a cache cycle.

When '486 is connected to a system with 16-bit bus and BS16# is pulled low ("BS16#="0"), it must issue 8 memory read cycles to complete each cache cycle.

The internal cache of the '486 can be set either to ENABLE or DISABLE by software. Whether the internal cache is enabled can be detected from the outside from a '486 output PCD.

To determine whether it can enter into a cacheable memory read cycle after '486 has initiated a memory read cycle, '486 checks KEN# to determine whether the internal cache of the '486 is enabled, as well as whether that memory read cycle is a lock cycle. "Lock Cycle" means the '486 needs to issue multiple CPU cycles to the external memory in executing an instruction and that '486 will not relinquish control (e.g. it will not accept the P23HOLD signal from the power-up sequencer 2, which will put the '486 into HOLD) before completion of these CPU cycles. Whether the CPU cycle initiated is a LOCK cycle can be detected from the LOCK# pin (LOCK#="0" means that a CPU cycle is a LOCK cycle, LOCK#="1" means that it not a LOCK cycle).

The following is a description of how the low portion address (BE3#, BE2#, BE1#, BE0#) of the '486 format (32 bit architecture) is changed to the low portion address (A0, A1, BHE#) of the '386 formal (16 bit architecture).

As described previously, to enable the '486 to operate with a data bus of 16 bits long, besides pulling down BS16#, low portion address (BE3#-BE0#) of the '486 format must be converted into the low portion address (A0, A1, BHE#) of the '386 format.

In other words, during a non-cacheable memory read cycle, when the '486 detects from the low portion address (BE3#-BE0#) that the data it accesses is more than 16 bits long or when the data extends between low word portion (HD0–HD15) and the high word portion (HD16–HD31), then '486 must initiate two CPU cycles. In the second CPU cycle, the '486 changes the low portion address (BE3#-BE0#) to (A0, A1, BHE#) in order to read the high word portion.

TABLE 9

| BE3# | BE2# | BE1# | BE0# | A0 | A1 | BHE# |
|------|------|------|------|----|----|------|
| 0 | 0 | 0 | 0 | 0 | 0 | 0 |
| 0 | 0 | 0 | 1 | 1 | 0 | 0 |
| 1 | 0 | 0 | 0 | 0 | 0 | 0 |
| 0 | 0 | 1 | 1 | 0 | 1 | 0 |
| 1 | 1 | 0 | 0 | 0 | 0 | 0 |
| 0 | 1 | 1 | 1 | 1 | 1 | 0 |
| 1 | 0 | 1 | 1 | 0 | 1 | 1 |
| 1 | 1 | 0 | 1 | 1 | 0 | 0 |
| 1 | 1 | 1 | 0 | 0 | 0 | 1 |

The relationship between the low portion address (BE3#-BE0#) sent out in the first CPU cycle and the low portion address (BE3#-BE0#) sent out in the second CPU cycle, along with the relationship between the low portion address (BE3#-BE0#) sent out in the second CPU cycle and the low portion address (A0, A1, BHE#) changed therefrom for reading the high word portion, are listed in Table 10.

In Table 10, "X" represents that the second cycle is unnecessary and that there is no need to make a second conversion.

TABLE 10

| 1st Cycle | | | | 2nd Cycle | | | | relation to 2nd cycle | | |
|---|---|---|---|---|---|---|---|---|---|---|
| BE3# | BE2# | BE1# | BE0# | BE3# | BE2# | BE1# | BE0# | A0 | A1 | BHE# |
| 0 | 0 | 0 | 0 | 0 | 0 | 1 | 1 | 0 | 1 | 0 |
| 0 | 0 | 0 | 1 | 0 | 0 | 1 | 1 | 0 | 1 | 0 |
| 1 | 0 | 0 | 0 | 1 | 0 | 1 | 1 | 0 | 1 | 1 |
| 0 | 0 | 1 | 1 | x | x | x | x | x | x | x |
| 1 | 0 | 0 | 1 | x | x | x | x | x | x | x |
| 1 | 1 | 0 | 0 | x | x | x | x | x | x | x |
| 0 | 1 | 1 | 1 | x | x | x | x | x | x | x |
| 1 | 0 | 1 | 1 | x | x | x | x | x | x | x |
| 1 | 1 | 0 | 1 | x | x | x | x | x | x | x |
| 1 | 1 | 1 | 0 | x | x | x | x | x | x | x |

In executing a cacheable memory read cycle, '486 will ascertain that it is executing a cacheable memory read cycle only after it senses KEN#="0", PCD="0", and LOCK#="1" at the first memory read cycle.

Therefore, the '486 begins a cacheable memory read cycle with the assumption that it is a non-cacheable memory read cycle. After it ascertains that it is in a cacheable memory read cycle, '486 will enter into a cacheable memory read cycle from a non-cacheable memory read cycle. But in this way, during the cacheable memory read cycle, because the low portion address (BE3#-BE0#) sent out by the '486 during the first memory read cycle may only read 24 bits, 16 bits, or 8 bits of data, the data read by the '486 before finishing the cacheable memory read cycle may not be 128 bits.

To ensure that the '486 reads 128 bits of data after a cacheable memory read cycle, the low portion address (BE3#-BE0#) sent by the '486 in the first memory read cycle is ignored and replaced by a low portion address which forces the '486 to read 32 bits of data in the first memory cycle. For example, when the low portion address (BE3#-BE0#) in the first memory read cycle is "0011", then A0, A1, and BHE# should be "010" (see table 9) during the non-cacheable memory read cycle. But during the cacheable memory read cycle, A0, A1, and BHE# will be forced to "000".

This ensures that during the cacheable memory read cycle, the data read in the first memory read cycle is 32 bits.

The bus interface 15, according to the present invention, comprises a low word swap buffer 16, a high word swap buffer 17, and a decoder 5.

The main functions of the low word swap buffer 16 and the high word swap buffer 17 are to convert data between the 32-bit (HD0-HD15) data bus and the 16 bit system data bus. The control signals (MDGTO#, MDIRO;

MDGT11#, MDIR1) for controlling the conversion come from the decoder 5.

MDGTO# and MDGT1# are used to enable or disable the low word swap buffer 16 and the high word swap buffer 17 respectively. MDIRO and MDIR1 are used to control the direction of data to/from both the low word swap buffer 16 and the high word swap buffer 17. For example, when MDGTO#="0", the low word swap buffer 16 will be enabled; when MDGTO#="1", the low word swap buffer 16 will be disabled; when MDIRO="0", the 16-bit low word data (HD0-HD15) will be allowed to be sent to the system data bus; and when MDIRO="1", the 16-bit data (D0-D15) from the system data bus will be sent to the CPU data bus (HD0-HD15). MDGT1# and MDIR1 are used to control the high word swap buffer 17 and their operations are similar to those of MDGT0 and MDIR0.

Besides generating the control signals (MDGT0#, MDIR0, MDGT#1, MDIR1) to control the enabling/disabling and direction of data of the low word swap buffer 16 and the high word swap buffer 17, the decoder 5 also changes the low portion address (BE3#, BE2#, BE1#, BE0#) of the '486 format into the low portion address (A0, A1, BHE#) of the '386 format.

Decoder 5 comprises three programmable array logic devices (16R4PAL, U9; 16L8PAL, U10; 20R4PAL, U11) and a programmable output port U15.

A basic function of the 16R4PAL U9 is to generate CYCLE and A1EN#. When ADS#="0" and P9HLDA="1", CYCLE will change from "0" to "1" and will stay in "1" until CPURDY#="0", at which time, CYCLE will go back to "0". Therefore, CYCLE defines a CPU cycle in which 16L8PA1 U10 and 2DR4PA1 U11 can send out signals such as KEN# and FLUSH#.

When a CPU requests a certain number of bits of data from the interface controller 6 (e.g., external memory), such data may be sent in sub-units. BLAST# is provided to indicate when all requested data have been sent. For example, in accessing a line of cache data (128 bits), the data may be sent in 8 sub-units each of which is 16 bits long. The BLAST# will be high when the first 7 sub-units are sent and will be low at the ime when the last sub-unit is sent.

A1EN# changes from "0" to "1" when BLAST#="1" and CPURDY="0". A1EN# will change back to "0" when BLAST#="0" and CPURDY#="0". Thus, BLAST#="0" and CPURDY#="0" can be used to indicate the end of a CPU cycle. In other words, if A1EN# is "0", then the subsequent CPU CYCLE will be the beginning of a new CPU cycle. Therefore, the low portion address (BE3#=BE0#) sent by the '486 during the first CPU cycle can be changed to A0=A1=BHE#="0" using A1EN#="0", PCD="0", KEN#="0", and LOCK#="1". This will ensure that the '486 reads the 32 bits in the first cacheable cycle.

The 16L8PAL U10 operates to generate KEN# and FLUSH#. KEN# is used to indicate to the '486 whether the CYCLE is a cacheable cycle. If an accessed address (e.g. A15–A23) falls within the area available for cacheable memory and/or cacheable write, and if the internal cache of the '486 is enabled (PCD="0"), then KEN#="0". If the address falls outside the area available for cacheable access or if the internal cache of the '486 is disabled (PCI="1"), then KEN#="1".

FLUSH# is used to signal the '486 whether or not the internal cache needs to be flushed. For example, when the address sent by the '486 in the cacheable write cycle falls outside of the cacheable area (e.g., in area reserved for the basic input/output system, BIOS), then FLUSH#="0".

2OR4PAL U11 operates mainly to generate MDGT0# and MDIR0 which are used to control the low word swap buffer 16. It also generates MDGT1E and MDIR1 which are used to control the high word swap buffer 17. In addition, 2OR4PAL U11 functions to convert the low portion address (BE3#, BE2#, BE1#, BE0#) of a 32-bit system into low portion address (A0, A1, BHE#) of a 16-bit system, in accordance with that shown in Table 10. This conversion is performed under the control of ADS#, P23M/IO#, W/R CYCLE, A1EN#, LOCK#, and PCD.

The programmable input/output port U15 of the decoder writes data (D0) in response to input operation (IOW#, SA0–SA9). As a result, 16L8PAL U10 can, within a specified address area, use software control to change the decoding address range of KEN# and FLUSH#.

When '386 enters RESET, (P9RST="1" P9HLDA="0"), it will output A0, A1, and BHE# (see Table 2). Similarly, when '486 enters RESET (P23RST="1", P23HLDA="0"), it will output BE3#-BE0# (see Table 3).

Therefore, to avoid signal contention when '386 and '486 coexist, P9HLDA="0" is sent to decoder 5 to prevent '486 from using decoder 5 to change BE3#-BE0# to A0, A1, and BHE# when '386 is in RESET.

In addition, when the '486 enters into HOLD (P23HLDA="1"), BE3#-BE0# will float (see Table 5). Therefore, P23HLDA="1" is sent to decoder 5, so that A0, A1, and BHE#, which decoder 5 changes from BE3#-BE0# will also float. Because P23HLDA is pulled high (+5 V) when the second CPU socket 7 is not plugged in with a '486, A0, A1, and BHE# from decoder 5 will also float in conformance to the specifications.

The above is a description of the system having a 16-bit wide system bus 12. However, this invention is not limited to the 16-bit systems.

For example, when the system bus 12 is 32 bits, most of the features described herein are still applicable. FIG. 8 is a map identifying the spatial relationship of FIGS. 8A–8C. FIGS. 8A–8C show another embodiment of the present invention utilizing a 32-bit wide system bus. The major difference between the system in FIGS. 1A–1C and the system in FIGS. 8A–8C is that '386 sends the low portion address (SBE0#-SBE3#) directly to the system bus 12, whereas the low portion address (BE0#-BE3#) from the '486 are changed by the decoder 5 to SBE0#-SBE3# before it is sent to the system bus 12. Moreover, because the data signals are 32 bits, BS16# of the '486 need not be pulled to ground and there is no need to handle the so-called low portion bit data or high portion bit data.

The following embodiments are described, by way of example, with reference to models 80486SX, 80486DX, and 80487SX of Intel Corporation's central processors. These different models of processors operate on different frequencies and have the following pin assignments:

TABLE 11

| Pin No. | A13 | A15 | B14 | B15 | C14 |
| --- | --- | --- | --- | --- | --- |
| 80486SX | NC | NMI | NC | NC | NC |
| 80468DX | NC | IGNNE# | NC | NMI | FERR# |
| 80487SX | FERR# | IGNNE# | MP# | NMI | NC |

"NC" means that the corresponding pin of a processor is not connected.

There are two differences between pinouts of 80487SX and 80486DX.

In 80487SX, the FERR# signal (which carries an output signal indicating occurrence of a floating point error) is assigned to pin A13. In contrast, the FERR# signal is assigned to pin C14 in the 80486DX. In addition, 80487SX has an output signal (MP#) on pin B14, but pin B14 of the 80486DX is not used. The MP# signal is activated low and is never floated. It is driven low at power up and remains active for the entire duration of the processor's operation.

Figure 10:
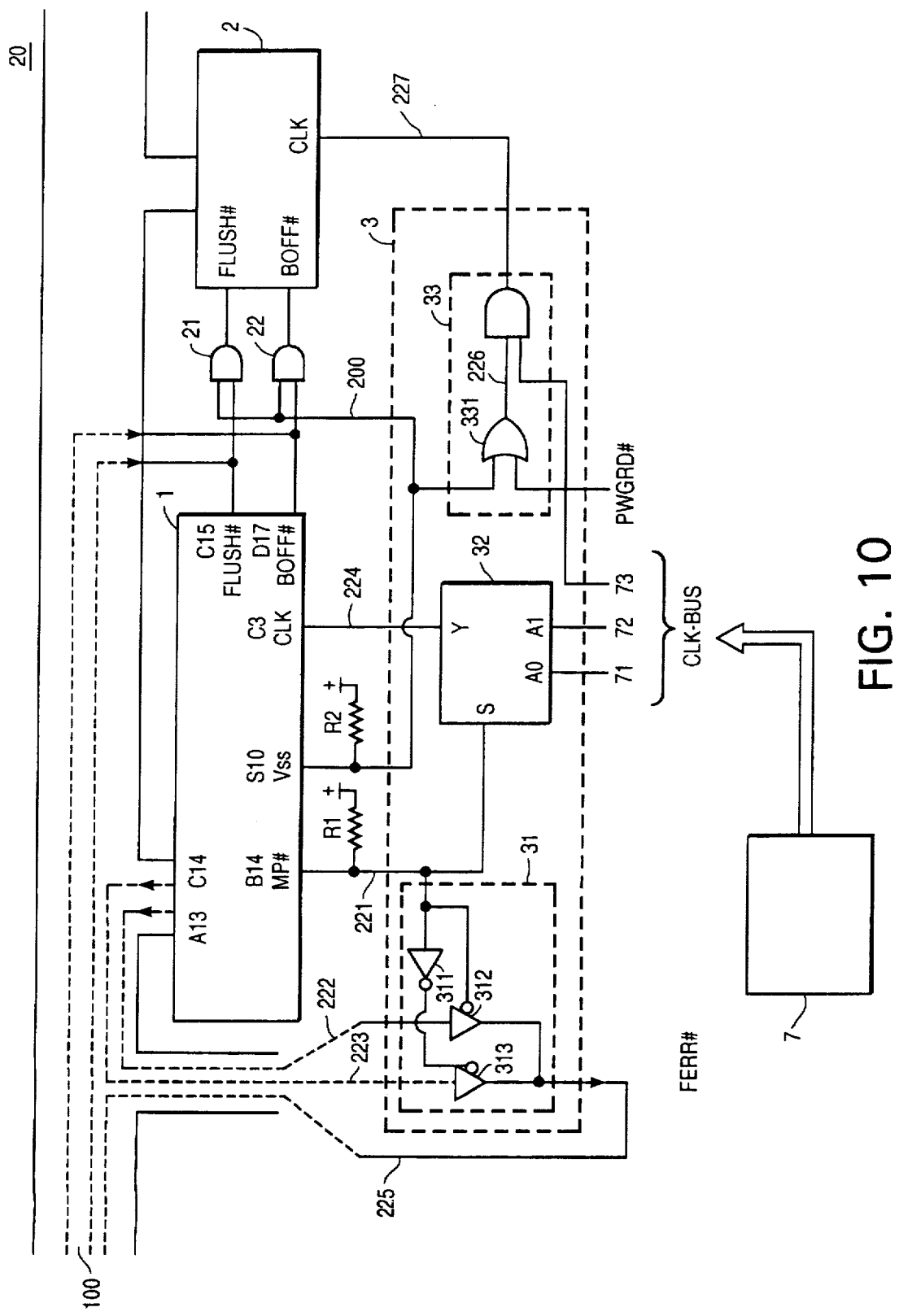
FIG. 10 is a logic block diagram illustrating a computer system wherein the present invention is embodied.

FIG. 10 is a block diagram of a computer system 20 wherein the present invention is embodied. The computer system 20 comprises a first socket 1001 for receiving a first processor and a second socket 1002 for receiving a second processor. The first socket 1001 and the second socket 1002 are each connected to a bus 100 through which address, data, and control signals are passed. Not shown in FIG. 10 are memory, input/output devices, and other components of the system. These components are not shown because they are generally known to those skilled in the art.

According to a preferred embodiment of the present invention, the first socket 1001 is capable of receiving either the 80486DX or the 80487SX processor models. The first socket 1001 is connected to a circuit 1003 which, as will be described herein below, is capable of identifying the model of processor plugged into the socket 1001 as well as generating clock frequency appropriate for the model plugged in.

Pin B14 of the first socket 1001, which is used to output the MP# signal if a 80487SX model is plugged in, or is open when a 80486DX is plugged in, is tied to a "high" voltage signal through a resister R1.

Upon entering the circuit 1003, the MP# signal 221 will be used to drive a selector 32. The selector 32 has two inputs, A0 and A1. A0 receives a clock signal 71 from the clock source 1007, whose frequency is appropriate for operation of 80486DX. A1 receives a clock signal 72 from the clock source 1007, whose frequency is appropriate for the operation of 80487SX. Depending on the logic signal level of the selection control pin S, which is controlled by the output of the MP# signal 221, one of these clock signals will be the input to the first socket 1001 at clock pin C3. When a 80486DX is plugged in, the logic signal level of the selection control pin S will be low because of the MP# signal at pin B14.

The signal (either the MP# signal or a high voltage) from pin B14 of the first socket 1001 is also used to control two tri-state gates 312 and 313. The input of tri-state gate 312 is coupled to pin A13 of socket 1001 for passing the FERR# signal 1 when the 80487SX processor is inserted into socket 1001. The input of the other tri-state 313 is coupled to pin C14 of socket 1001 for passing the FERR# signal when the 80486DX processor is inserted into socket 1001. Thus, each of these two gates 312 and 313 receives the FERR# signal from the first socket 1001 when the appropriate processor is inserted into the socket 1001. However, because of the inverter 311, only one gate, 312 or 313, will pass the FERR# signal at any instant. When a 80486DX is plugged in, gate 313 will be enabled and the FERR# signal at pin C14 of the first socket 1001 will be gated to the bus 100 by line 225. When a 80487SX is plugged in, gate 312 will be enabled and the FERR# signal at pin A13 of the first socket 1001 will be gated to the bus 100.

To further improve flexibility of the computer system 20, a second socket 1002 is provided for the connection of a 80486SX processor. In the event that both the first socket 1001 and the second socket 1002 house processors, the processor in the second socket 1002 will be disabled.

This is accomplished by the signal 200 coming out of the "Vss" pin S10 of the first socket 1001. This "Vss" pin S10 is tied to a logic "high" voltage signal through a resister R2.

It will be understood by those skilled in the art that while this improved circuit can accept two processors, both processors do not need to be plugged in concurrently for the computer system to operate.

When a processor is plugged into the first socket 1001, the signal 200 from the "Vss" pin S10 will disable signals (e.g. BOFF# and FLUSH#) to the second socket 1002 by AND gates 21 and 22. The method of disabling a processor in a two-processor system using a signal from the non-disabled processor is known to the art.

Advantageously, the signal 200 from the "Vss" pin S10 is also used to disable clock signal 73 from clock source 1007 into the first socket 1001 so as to reduce power spent by the disabled processor. To allow the processor in the second socket 1002 to stabilize, circuit 33 is used.

Circuit 33 basically ORs the signal 200 with a "power good" (PWGRD#) signal of the computer system 20. The output signal 226 of OR gate 331 is then used to control the clock signal 73 to the second socket 1002. The PWGRD# signal would become active only for a few cycles immediately after power on. The effect is to have the PWGRD# signal enable the clock signal 73 to pass to the processor in the second socket 1002 in order to allow it to stabilize.

Figure 11:
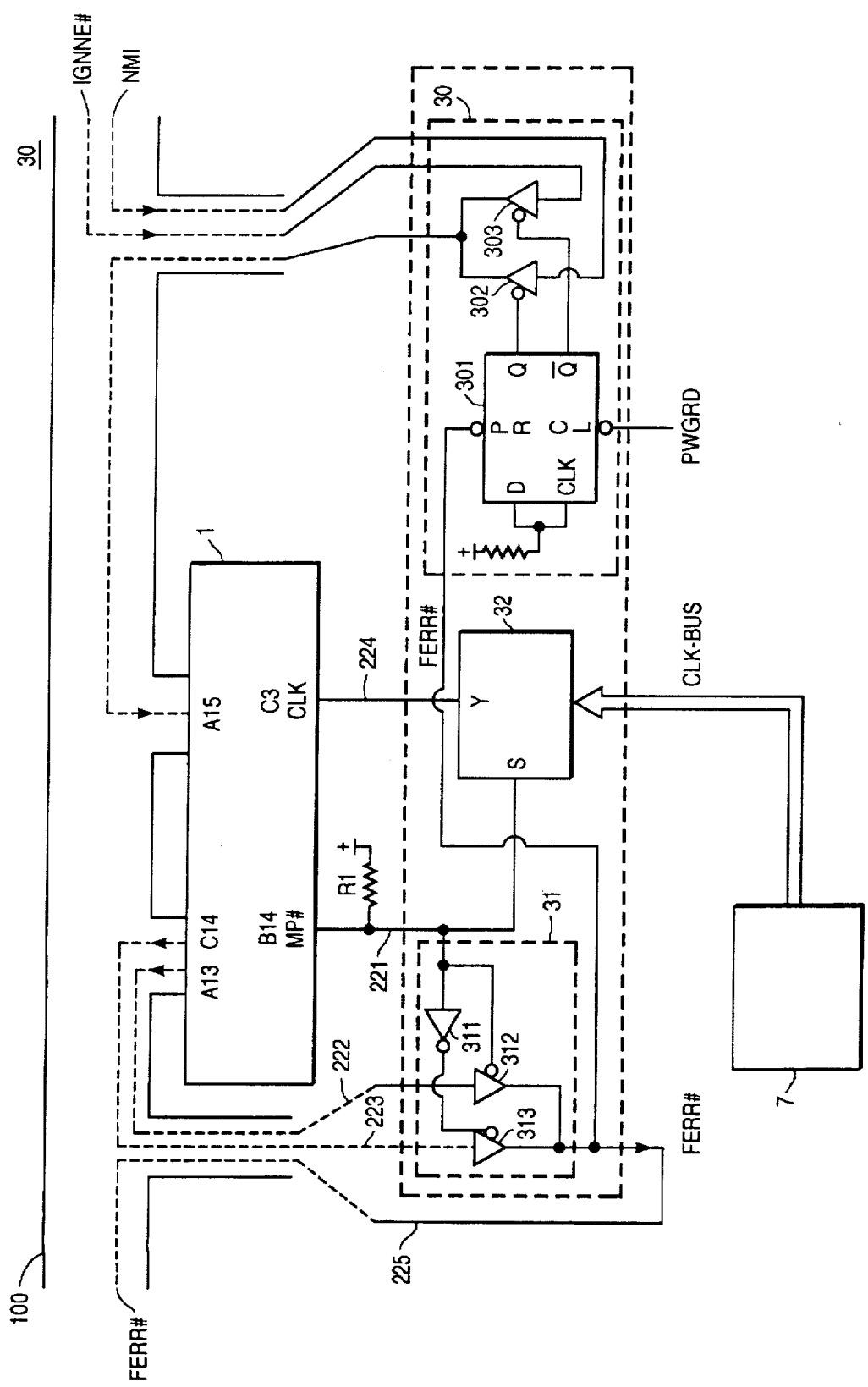
FIG. 11 is a logic block diagram illustrating an alternate embodiment of the computer system of the present invention.

Referring now to the logic diagram of FIG. 11, an alternative embodiment for the upgradeable/ downgradeable computer system is illustrated. The upgradeable/ downgradeable computer system preferably has a CPU socket capable of housing different models of central processing units, such as the 80486SX, 80487SX, and 80486DX.

As shown in Table 1, pin A13 of 80487SX is assigned to FERR# signal, but pin C14 of 80486DX is for the FERR# signal; pin A15 of 80486SX is for NMI, but pin A15 of 80486DX or 80487SX is for IGNNE# signal. Therefore, the problem of pin assignment such as that of A13 or C14 (which connects to bus 100, handling the floating point error signal FERR# 225) or A15 (which connects to bus 100, handling the ignore error signal IGNNE# or non-maskable interrupt request NMI) must be resolved before CPU socket 1001 is capable of holding different models of processors like 80486SX, 80486DX, and 80487SX.

The basic function of the control circuit 30 is to control the IGNNE# or NMI signals of bus 100 which connects to pin A15 of CPU socket 1001. Circuit 30 comprises a D type flip-flop 301 and two gates 302 and 303.

The data input D and the clock input (CLK) of flip-flop 301 are tied to a high voltage through a pull up resistor. The output Q of said flip-flop 301 is used to control gate 302, and the inverted output Q' is used to control gate 303. The clear input CL of said flip-flop 301 is connected to a power good signal (PWGRD) which shows the stability of the power supply. The preset input (PR) is connected to the FERR# signal on line 225. Generally, the present invention employs 80486SX in CPU socket 1001 as processor if not otherwise specified. The system 30 can be upgraded by replacing the 80486SX with either a 80487SX or 80486DX in CPU socket 1001.

When a 80486SX is plugged in CPU socket 1001, since pin B14 of 80486SX is "NC", the signal 221 is coupled to a high voltage through a resistor R1, thereby turning off gate 312 and turning on gate 313. As a result, the signal at pin C14 of CPU socket 1001 is then gated to bus 100. Since pin C14 of the 80486SX is "NC" because the 486SX does not comprise an internal coprocessor, neither a high logic level nor a low level voltage will be outputted on line 225 as the FERR# signal. Thus, the FERR# signal will not affect the normal operation of the system 30 in this case.

As mentioned above, when CPU socket 1001 is occupied by 80486SX, pin C14 is "NC" and connected to FERR# 225, and since FERR# 225 is connected to the preset input PR of the D type flip-flop 301, the output (Q or Q') of the flip-flop 301 will remain unchanged. This means that when 80486SX is used in default, the NMI signal is sent through tri-state gate 302 and input to pin A15 of the CPU socket 1001.

Moreover, when a 80486SX is plugged in CPU socket 1001 and PWGRD signal is sent to the clear input CL of the flip-flop 301, since the data input D of the flip-flop 301 and the clock input CLK are tied "high", the voltage of the output Q of the flip-flop 301 is low ("0") and the voltage of the inverted output Q' of the flip-flop 301 is high ("1"). If the voltage of the output Q of the flip-flop 301 is low, gate 302 will be turned on, allowing the NMI signal to be sent to pin A15 of CPU socket 1001, while the gate 303 will be turned off, disconnecting the IGNNE# from pin A15 of CPU socket 1001.

However, if a 80486DX or 80487SX is plugged in CPU socket 1001, pin A15 of CPU socket 1001 must be connected to the IGNNE# signal of bus 100. Simultaneously, pin A15 of CPU socket 1001 is disconnected from the NMI signal of bus 100.

To accomplish this, the present invention executes a segment of a program to test the existence of coprocessor before initiating POST (Power On Self Test) of the BIOS (Basic Input/Output System). If a coprocessor exists, the program will then intentionally generate a computing error for the coprocessor, such as executing three basic coprocessor instructions FLD1, FLDZ, and FDIV to perform a division by zero. Therefore, a low voltage ("0") for FERR# signal will be outputted from pin A13 or pin C14 of the CPU socket 1001 to the preset input (PR) of the flip-flop 301.

When the logic low level of FERR# signal is sent to the preset input of flip-flop 301, the output Q of the flip-flop 301 will be high ("1").

Therefore, gate 302 is turned off to disconnect the NMI signal pin A15 of CPU socket 1001. Meanwhile, the inverted output Q' of the flip-flop 301 will be low ("0"), and gate 303 will be turned on, allowing IGNNE# signal to be connected to pin A15 of CPU socket 1001. Therefore, a socket 1001 capable of receiving 15 different models of central processors such as 80486SX, 80487SX, and 80486DX can be accomplished.

While the invention has been described with respect to preferred embodiments thereof, it is to be understood that the foregoing and other modifications and variations may be made without departing from the scope and spirit thereof.

What is claimed is:

1. An upgradeable/downgradeable central processing unit (CPU) chip computer system for driving by more than one type of CPU chip, said computer system including a circuit board, the circuit board comprising:

a first socket, disposed on the circuit board, for receiving different types of CPU chips, wherein at least first and second of said different types of CPU chips drive a particular output signal on different first and second respective output pins, depending on the type of CPU chip;

an identifying circuit, disposed on the circuit board and coupled to said first socket, for identifying the type of CPU chip inserted in said first socket and for generating an identification signal in response to the identification;

a clock signal generator coupled to said identifying circuit and to said first socket, responsive to said identification signal for generating clock signals compatible with the type of CPU chip in the first socket; and an enabling circuit, disposed on the circuit board and coupled to said identifying circuit and said first socket, responsive to said identification signal for (a) enabling signals on said first output pin to be transmitted when one of said first type of CPU chips is in said first socket and (b) enabling signals on said second output pin to be transmitted when one of said second type of CPU chips is in said first socket, thereby allowing said particular output signal to be transmitted regardless of which one of said first and second types of CPU chips are in said first socket.

2. The computer system of claim 1, wherein said identifying circuit comprises means for detecting a logic state of at least one signal output from the CPU chip in said first socket.

3. The computer system of claim 1, wherein said clock signal generator is a frequency generator.

4. An upgradeable/downgradeable central processing unit (CPU) chip computer system for driving by more than one type of CPU chip, said computer system including a circuit board, the circuit board comprising:

a first socket, disposed on the circuit board, for receiving different types of CPU chips, wherein at least first and second of said different types of CPU chips drive a particular output signal on different first and second respective output pins, depending on the type of CPU chip;

an identifying circuit, disposed on the circuit board and coupled to said first socket, for identifying the type of CPU chip inserted in said first socket and for generating an identification signal in response to the identification;

a clock source generating first and second clock signals compatible with said first and second types of CPU chips; p1 a data selector, having inputs coupled to receive said first and second clock signals, a data selection control input coupled to receive said identification signal, and an output coupled to said first socket, whereby (a) said first clock signal, is communicated to said first socket when said identification signal indicates that a CPU chip of said first type is in said first socket, and (b) said second clock signal is communicated to said first socket when said identification signal indicates that a CPU chip of said second type is in said first socket; and selecting means, disposed on the circuit board and coupled to said first socket, for (a) enabling signals on said first output pin to be transmitted when one of said first type of CPU chips are in said first socket and (b) enabling signals on said second output pin to be transmitted when one of said second type of CPU chips are in said first socket, thereby allowing said particular output signal to be transmitted regardless of which one of said first and second types of CPU chips are in said first socket.

5. An upgradeable/downgradeable central processing unit (CPU) chip computer system for driving by more than one type of CPU chip, said computer system including a circuit board, the circuit board comprising:

a bus disposed on the circuit board for communicating address, data, and control signals, said bus including a particular output bus line for a particular output signal;

a first socket, disposed on the circuit board and coupled to said bus, for receiving different types of CPU chips, wherein at least first and second of said different types of CPU chips drive said particular output signal on different first and second respective output pins, depending on the type of CPU chip;

an identifying circuit, disposed on the circuit board and coupled to said first socket, for identifying the type of CPU chip inserted in said first socket and for generating an identification signal in response to the identification;

a clock signal generator coupled to said identifying circuit and to said first socket, responsive to said identification signal for generating clock signals compatible with the type of CPU chip in the first socket; and an enabling circuit, disposed on the circuit board and coupled to said identifying circuit and to said bus, responsive to said identification signal for (a) enabling signals on said first output pin to be transmitted to said particular output bus line when one of said first type of CPU chips is in said first socket and (b) enabling signals on said second output pin to be transmitted to said particular output bus line when one of said second type of CPU chips is in said first socket, thereby allowing said particular output signal to be transmitted to said particular output bus line, regardless of which one of said first and second types of CPU chips is in said first socket.

6. The computer system of claim 5, wherein said identifying circuit comprises means for detecting a logic state of at least one signal output from the CPU chip in said first socket.

7. The computer system of any of claims 1, 4, and 5 wherein the first socket is adapted to receive a CPU chip selected from the group consisting of 80486DX and 80487SX microprocessor chips.

8. An upgradeable/downgradeable central processing unit chip (CPU) computer system for driving by more than one type of CPU chip, said computer system including a circuit board, the circuit board comprising:

a bus for communicating address, data, and control signals, said bus including a particular output bus line for a particular output signal;

at least one socket means, disposed on the circuit board and coupled to said bus, for plugging in different types of CPU chips, wherein at least first and second of said different types of CPU chips drive said particular output signal on different first and second respective output pins, depending on the type of CPU chip;

said socket means having engagement portions for said first and second output pins;

a clock signal generator, disposed on the circuit board and coupled to said socket means, for generating a clock signal compatible with the type of CPU chip inserted in said socket means;

a first signal path coupled to said engagement portion for said first output pin, and a second signal path coupled to said engagement portion for said second output pin; and an identifying circuit, disposed on the circuit board and coupled to said socket means, for identifying the type of CPU chip inserted in said socket means and for generating an identification signal in response to the identification;

a clock source generating first and second clock signals compatible with said first and second types of CPU chips and a third clock signal compatible with a CPU chip in said socket means;

a data selector, having inputs coupled to receive said first and second clock signals, a data selection control input coupled to receive said identification signal, and an output coupled to said socket means, whereby (a) said first clock signal is communicated to said socket means when said identification signal indicates that a CPU chip of said first type is in said socket means, and (b) said second clock signal is communicated to said socket means when said identification signal indicates that a CPU chip of said second type is in said socket means; and selector means, disposed on the circuit board and coupled to said signal paths and to said output bus line, for selecting one of said first and second signal paths for providing said particular output signal, said selection being responsive to the type of CPU chip in said socket means, thereby allowing said particular output signal to be transmitted to said output bus line, regardless of which one of said first and second types of CPU chips is in said socket means.

* * * * *